United States Patent [19]
Behrends

[11] Patent Number: 5,863,433
[45] Date of Patent: Jan. 26, 1999

[54] RECIPROCATING SUBSURFACE-FLOW CONSTRUCTED WETLANDS FOR IMPROVING WASTEWATER TREATMENT

[75] Inventor: Leslie L. Behrends, Florence, Ala.

[73] Assignee: Tennessee Valley Authority United States Corp.

[21] Appl. No.: 755,858

[22] Filed: Dec. 2, 1996

[51] Int. Cl.$^6$ .................................................. C02F 3/30
[52] U.S. Cl. ...................... 210/602; 210/605; 210/617; 210/747; 210/150; 210/170; 210/703
[58] Field of Search ................... 210/602, 617, 210/605, 630, 747, 150, 151, 170, 253, 258, 903

[56] References Cited

U.S. PATENT DOCUMENTS

| | | | |
|---|---|---|---|
| 3,770,623 | 11/1973 | Seidel | 210/602 |
| 4,333,837 | 6/1982 | Plósz et al. | 210/170 |
| 4,415,450 | 11/1983 | Wolverton | 210/602 |
| 4,678,582 | 7/1987 | Lavigne | 210/150 |
| 5,078,882 | 1/1992 | Northrop | 210/602 |
| 5,437,786 | 8/1995 | Horsley et al. | 210/170 |
| 5,472,472 | 12/1995 | Northrop | 5210/602 |
| 5,626,644 | 5/1997 | Northrop | 210/602 |

Primary Examiner—Christopher Upton
Attorney, Agent, or Firm—Robert A. Petrusek

[57] ABSTRACT

This invention relates to the design and operation of paired subsurface flow constructed wetlands in which significant improvements in wastewater treatment are possible. These improvements are brought about by coupling paired subsurface flow wetlands and using reciprocation, whereby adjacent cells are sequentially and recurrently drained and filled using either gravity, mechanical pumps, U-tube air-lifts and/or a combination thereof. This fill and drain technique turns the entire wetland area into a biological reactor, complete with anoxic, anaerobic and aerobic environments. The frequency, depth and duration of the fill and drain cycle can be adjusted to control redox conditions for specific biologically mediated reactions including, but not limited to, nitrification, denitrification, sulfate reduction, and methanogenesis. Emissions of noxious gases such as hydrogen sulfide and mentane can be minimized. Furthermore, by allowing cells to fill to above the level of the substrate by approximately 2 to 4 inches on the fill cycle, it is possible to enhance algal photosynthesis, increase pH, and facilitate photo-oxidative reactions.

15 Claims, 5 Drawing Sheets

5,863,433

RECIPROCATING SUBSURFACE-FLOW CONSTRUCTED WETLANDS FOR IMPROVING WASTEWATER TREATMENT

The invention herein described may be manufactured and used by or for the government for governmental purposes without the payment to me of any royalty therefor.

INTRODUCTION

Constructed wetlands are manmade structures designed for wastewater treatment and typically have a relatively impermeable bottom and a layer(s) of soil, muck, gravel, or other media to support the roots of emergent aquatic plant species. Two types of constructed wetlands are currently used for wastewater treatment: freewater surface and sub-surface flow. Details of both types will be discussed in a later section. The present invention relates to the design and operation of biological wastewater treatment systems including subsurface-flow constructed wetlands in which vastly improved aeration and wastewater treatment are possible. These improvements are brought about by coupling multiple treatment units (cells) which, for example, could include subsurface-flow constructed wetlands, and using recurrent reciprocation, whereby such adjacent or juxtaposed cells are alternately and recurrently drained (partially), and filled using any number of convenient means including: gravity, pumps, and/or u-tube airlift technology. The reciprocation effected by the recurrent fill and drain technique turns the entire treatment unit area into a biological reactor having alternating aerobic and anaerobic zones. The hydraulic residence time and the frequency and duration of the fill and drain cycle can be adjusted to control redox conditions for specific biotic and abiotic reactions including but not limited to, nitrification, denitrification, sulfate reduction, and methanogenesis. For purposes of convenience and for ease of understanding by the reader, reciprocation is often herein discussed in terms of two paired treatment cells, and in this particular case, paired wetland cells. Nonetheless, it should be understood and appreciated by those skilled in the art that the concept of recurrent reciprocation can be applied to a plurality of treatment and/or wetland cells, not to just one or more sets of paired cells. For instance, a single mother cell may fill from and drain to a number of daughter cells.

Adjusting water levels to above the level of the substrate by approximately 2 to 10 centimeters during the fill cycle, also makes it possible to enhance algal photosynthesis, increase pH, and facilitate various photo-oxidative reactions which can serve to improve the wastewater treatment processes and aid in the destruction of various sewage related pathogens.

BACKGROUND OF THE INVENTION

1. Field of the Invention

Civilizations throughout history have caused pollution of air and water due to agriculture, industry and domestic activities. Such pollution, if significant and if left untreated, can result in serious harm to freshwater and marine ecosystems. A recent example involves the pollution and resulting ecological impairment of the Chesapeake Bay, contiguous estuaries and watershed streams and reservoirs.

Because of these threats to the environment, various wastewater treatment systems have been developed to reduce, remove, and/or transform pollutants, thereby reducing their intrinsic capacity to do harm to the environment. In more recent times, a new paradigm has emerged related to development of environmentally sustainable technologies. These new technologies are being developed to cope with the continued depletion of resources and the ever rising costs of energy. For example, natural treatment systems such as constructed wetlands are being developed, refined and evaluated because of their low capital and operating costs, and because of the robust and sustainable nature of the technology Properly designed and operated surface- and subsurface-flow constructed wetlands can provide excellent and cost-effective removal of biological oxygen demand ($BOD_5$) suspended solids (SS), pathogenic bacteria, and other wastewater constituents from domestic, industrial and agricultural wastewaters. Several international symposia have been convened in the past decade regarding the utility of constructed wetlands for treating various types of wastewater. [D. A. Hammer (eds.), *Constructed Wetlands for Wastewater Treatment: Municipal, Industrial, and Agricultural*, Lewis Publishers, Chelsea, Mich., 1989]; [Cooper, et al. (eds.), *Constructed Wetlands in Water Pollution Control*, Pergamon Press, New York, N.Y., 1990]; and [G. A. Moshiri (ed.) *Constructed Wetlands for Water Quality Improvement*, Lewis Publishers, Boca Raton, Fla., 1993].

Wetlands, if designed and operated properly can provide a great diversity of physical, chemical and biological environments for degrading complex and oftentimes toxic pollutants. In many instances, sequential aerobic and anaerobic environments are required for degrading these complex organic compounds [Zitomer, et al., "Sequential Environments for Enhanced Biotransformation of Aqueous Contaminants," *Environ. Sci. Tech.*, 27:227–244 1993].

However, due to high levels of biological and chemical oxygen demand in the rootzone and interstitial water of wetlands, sufficient dissolved oxygen is not always available for aerobic oxidation of many toxic compounds. For example, adequate levels of dissolved oxygen (>1.0 ppm), are usually not available for optimizing the biological transformation of ammonia to nitrate, referred to as nitrification. In a recent article it was concluded that effective nitrogen (ammonia) removal will require longer hydraulic retention times and/or larger (costlier) wetlands, due to low oxygen availability [Reed, et al., "Constructed Wetland Design—the First Generation," *Water Environment Research*, (64): 776–781, 1992]. Furthermore, under conditions of elevated temperature and pH, ammonium (NH4+) is chemically transformed to its very toxic unionized form (NH3) and can adversely affect the aquatic biota of receiving streams. Similarly, certain dissolved metals, such as the reduced form of manganese, are toxic and difficult to remove from domestic and industrial wastewater streams. By providing coupled aerobic and anaerobic wetland environments, it is possible to remove metals either as metal-sulfides or metal-oxides, respectively.

The instant invention relates to a wastewater treatment system whereby individually paired or sequentially paired subsurface flow wetland cells are operated in such a way as to significantly increase the biomass and diversity of aerobic, facultative anaerobic and anaerobic biofilm organisms, thereby increasing the aerobic and anaerobic environments required for aerobic-anaerobic treatment processes. The action or technique used to facilitate the formation of these recurrent environments is herein referred to as recurrent reciprocation. Examples are provided infra to illustrate the mechanisms which enhance the broad utility of the instant invention and how the technology may be used with respect to domestic, industrial and agricultural wastewaters; the preferred embodiments of the present invention further address these problems.

2. Description of the Prior Art

There appears to be no prior art available which teaches constructed wetland wastewater applications utilizing the design or concept of recurrent reciprocation to affect oxygen transfer and the formation of recurrent and sequential aerobic and anaerobic treatment environments. For instance, in U.S. Pat. No. 681,884, Sep. 3, 1901, Monjeau, there is illustrated a vegetated trickling filter in which polluted water is irrigated unto a single cell that contains a perforated tray with vegetation followed by various-sized sub-terranean substrates to affect removal of sediments and nutrients. There is a provision for several trays of vegetation to be available for interchanging on a regular basis "so that the vegetation may not be destroyed." The design includes an "eccentrically-pivoted flap-valve" near the bottom of the treatment cell to periodically void water from the overlying sediments. However there is no provision for paired cells or recurrent reciprocation.

U.S. Pat. No. 3,770,623, Nov. 6, 1973, Seidel, teaches a horizontal flow subsurface flow wetland system (no recurrent reciprocation), in which various aquatic reeds are planted to purify polluted water. Seidel's design incorporates coarse substrate (gravel), on the bottom of the treatment bed and fine substrate (sand), on the top of the treatment bed for the expressed purposes of enhancing hydraulic conductivity and filtering of fine particulate matter, respectively. No mention is made of using fine-grained materials such as sand, to increase surface area for microbial colonization or enhance gaseous diffusion. The filtration beds (cells), as depicted in Seidel, supra, are in pairs to facilitate removing a single cell from service so that the fine sand layer can be cleaned and rejuvenated periodically since the fine sand layers are prone to plugging, especially under continuous anaerobic conditions. Suspended and dissolved material are removed in separate beds using different types of vegetation.

U.S. Pat. No. 4,331,538, May 25, 1982, Kickuth, discloses a horizontal flow wetland treatment bed supplemented with a soil matrix including iron and/or aluminum, and planted with aquatic plants to facilitate the removal of phosphorus from aqueous liquids such as sewage. Kickuth refers to formation of aerobic and anaerobic micro-environments, the aerobic micro-environments of which are reputedly due to the transport of oxygen from aquatic plant species into the root zone of the treatment bed. Although this is a mechanism for moving oxygen into the rootzone, subsequent mass balance research has shown this mechanism to be insufficient for meeting the respiration and oxygen demand of the root zone environment [Brix et al., "Soil Oxygenation in Constructed Reed Beds: The Role of Macrophyte and Soil-atmosphere Interface Oxygen Transport," *Constructed Wetlands in Water Pollution Control*, 1990, pp. 53–67].

In U.S. Pat. No. 5,174,897, Dec. 29, 1992, Wengrzvnek, describes a unique design of a surface-flow constructed wetland to control non-point source pollution, but all applications relate to surface flow wetlands with no mention of reciprocating mechanisms, or of subsurface flow modifications.

In U.S. Pat. No. 5,337,516, Aug. 16, 1994, Hondulas, teaches an invention consisting of a wastewater treatment basin and a number of emergent wetland plants in floating containers adapted to float in the wastewater basin such that the root systems of the floating plants treat the wastewater. However, there is no mention of subsurface flow or reciprocating mechanisms.

In the scientific literature, various wastewater applications have been evaluated with respect to enhancing oxygenation of water within constructed wetlands. Aeration of surface- or subsurface-flow wetlands with conventional surface aeration equipment is usually not practical, as the zone of influence is usually restricted to a small area proximate to the aeration device. Fine-bubble aeration is also not practical under conditions of shallow water (30 to 60 cm water depth is typical of surface- and subsurface-flow constructed wetlands), and ambient pressure (one atmosphere), because oxygen transfer ($g/m^2$/unit time) is limited by low hydrostatic and atmospheric pressure, and therefore not sufficient for maintaining oxygen concentrations required for most aerobic processes. This is especially true in wastewater treatment situations were biological oxygen demand is high due to biological respiration.

A unique class of subsurface flow wetlands, referred to as vertical-flow subsurface-flow wetlands, have also been designed based on enhancing oxygen transfer [Watson, et al., "Pilot-Scale Nitrification Studies using Vertical Flow and Shallow Horizontal Flow Constructed Wetland Cells," in G. A. Moshiri (ed.), *Constructed Wetlands for Water Quality Improvement*, CRC Press, Inc., Boca Raton, Fla., 1993 pp. 301–315]. Vertical flow systems incorporate an unsaturated zone (periodically voided of water), and work well, especially for small back-yard applications, but are prone to plugging due to microbial growths occurring between the fine sand particles. This is especially problematic in situations where the environment becomes anaerobic, thereby promoting the growth of slime bacteria, which exacerbate the problem of plugging.

Vertical flow designs require frequent irrigation of water onto the surface of a complex graded substrate (fine sand on top, followed by medium sand, followed by pea gravel), and are designed for sequential batch loading (no recurrent or reciprocating component). Reciprocating systems, on the other hand, are designed for batch and/or flow-through of wastewater, with water being pumped back and forth between contiguous basins on a recurrent schedule. This recurrent feature allows fixed-film microbial fauna and associated back-fill material(substrate), to be sequentially exposed to aerobic and anaerobic environments on a controlled basis. It is this unique combination of recurrent movement and controlled sequential exposure of wastewater and substrate to alternating environments that enables the subsequent development of unique microbial consortia and the enhancement of wastewater treatment.

Other gravel-based designs require expensive high-pressure electrical pumps and irrigation systems to spray irrigate the water over raised gravel beds [Askew, et al., "Constructed Wetland Recirculating Gravel Filter System: Full-Scale Demonstration and Testing," in *On-Site Wastewater Treatment, Proceedings of the Seventh International Symposium on Individual and Small Community Sewage Systems*, American Society of Agricultural Engineers, St. Joseph, Mich., 1994, pp. 85–94]. Although vertical flow wetlands and raised gravel-bed wetlands can function efficiently, they are costly to install, operate, and maintain for the reasons cited above, and do not have the unique feature of recurrent reciprocation that readily enhances wastewater treatment.

A team of researchers at the U.S. Virgin Islands have developed a recirculating reciprocating system (no recurrent movement of water between contiguous cells), for fish culture applications. However, the system is managed for aerobic processes, e.g., nitrification [J. E. Rakocy, "A Recirculating System for Tilapia Culture and Vegetable Hydroponics," in R. O. Smitherman and D. Tave (eds.), *Proceedings Auburn Symposium on Fisheries and Aquaculture*, Brown Printing Company, Montgomery, Ala., 1990, pp. 103–114]. In the aforementioned arrangement, a pretreatment system was installed to remove organic carbon (and associated biochemical oxygen demand), in a clarifier prior to water reaching the reciprocating system. This particular design, due to the carbon-removal pretreatment, resulted in formation of acidity from the nitrification process which eventually decreased the buffering capacity of the alkalinity system. To control acidity, a basic solution (potassium hydroxide), had to be added to the system on a routine basis to restore alkalinity. Furthermore, since the reciprocating system was operated in an aerobic mode, little denitrification occurred and as a result, nitrate accumulated to concentrations in excess of 100 ppm. As will be seen later, the instant invention includes natural waste treatment processes, such as calcite dissolution, sulfate reduction, denitrification and methanogenesis, which can restore alkalinity and control acidity, thus obviating the need for exogenous additions of alkalinity-producing chemicals.

It should also be noted that many wastewater treatment constructed wetlands are installed in pairs, or in multiples, both for reasons of enhanced treatment, and for reasons related to maintenance. For example, if there are problems related to bacterial clogging (see Seidel, '623, supra), a single wetland cell can be taken out of service for repair, while the other cell(s) stays "on-line." This ensures that at least one cell will always be available for wastewater treatment functions. This multiple cell horizontal-flow design concept of the prior art now fortuitously allows a relatively simple retrofit of the reciprocation process, thereby providing opportunities to upgrade existing subsurface flow wetlands which have failed and are in violation of discharge permit criteria.

Based on the documented understanding that subsurface-flow constructed wetlands are generally deficient in dissolved oxygen, efforts were undertaken in 1993 at the Tennessee Valley Authority (TVA), to evaluate the impact of reciprocation on oxygen transfer. A series of studies were initiated at the TVA Environmental Research Center facility in Muscle Shoals to determine the efficacy of a reciprocation process, whereby adjacent gravel-backfilled cells were alternately drained and filled with water, on a recurrent basis, to enhance transfer of atmospheric oxygen to the bulk water via diffusion. These studies were performed in oxygen deficient and non-biological systems to observe oxygen transfer rates in the absence of biological respiration. The initial studies were conducted in non-biological systems so that respiration (uptake of oxygen via biotic organisms), would not interfere with the measurement of oxygen transfer. Reciprocation, as practiced in these initial studies, was accomplished by sequentially moving water from one wetland cell to a contiguous cell on a batch loaded (no flow-through), and recurrent basis. Movement of water to initiate reciprocation can be accomplished with gravity, electrical and/or solar pumps, and/or u-tube air-lift principals. With u-tube air-lift applications, enhanced oxygenation is brought about by both mechanical means (u-tube air-lift and associated fine-bubble aeration), and by increased oxygen diffusion due to exposure of wetted surfaces of the abiotic rock (substrate), during the draw-down phase. Results of this preliminary study, detailing aspects of reoxygenation of water in deoxygenated and non-biological systems, were published in a regional symposium [L. L. Behrends, et al., "Oxygen Diffusion Rates in Reciprocating Rock Biofilters: Potential Applications for Subsurface Flow Constructed Wetlands," in Proceedings Subsurface Flow Constructed Wetlands Conference, University of Texas at El Paso, Aug. 16–17, 1993].

Another study was also conducted at the same TVA facility for purposes of evaluating the impact of reciprocation on the removal of metals, specifically manganese, from simulated acid mine drainage water, [Sikora, et al., "Manganese and Trace Metal Removal in Successive Anaerobic and Aerobic Wetland Environments," *American Power Conference*, Chicago, Ill., Apr. 18–20, 1995, sponsored by Illinois Institute of Technology]. In this study, recurrent reciprocation enhanced gas transfer via abiotic mechanisms in accordance with physical gas laws, such that oxygen concentrations and redox potential increased, while carbon dioxide concentrations decreased leading to a significant increase in pH. The combination of increased redox potential and increased pH, governed by the aforementioned gas laws, resulted in the putative abiotic removal of manganese. Abiotic processes are thought to be the major removal mechanism regulating removal of manganese (as oxides), in aerobic subsurface-flow wetlands. Other studies have also been concluded that support the abiotic removal process. McMillen et al., "Constructed Vertical Flow Aerated Wetlands: Manganese Removal from Acid Mine Drainage," *Proceedincrs American Water resources Association Annual Summer Symposium*, Jackson Hole, WY, Jun. 26–29, 1994, studied the use of unsaturated vertical flow wetlands to provide enough oxygen for manganese oxidation and precipitation and found that manganese could be removed at initial concentrations ranging from 0.5 to 60 mg/l. When a biocide was added to their study, manganese removal remained high, which indicated that abiotic catalysis of manganese oxidation was the controlling factor for manganese removal.

Subsequent to the above mentioned studies, other studies (unpublished and the basis for this patent application) were undertaken in complex biological systems to better understand the relationship between oxygen dynamics, oxygen concentration and redox potential, on rates of nitrification, denitrification, aquatic plant growth, and the removal of carbon (as measured by reduction of COD, the chemical oxygen demand of the wastewater), total nitrogen, orthophosphate and fecal coliform bacteria. It was only after conducting these additional and unpublished studies that it became apparent that it was not the reaeration of the water per se, as was concluded in the aforementioned published articles, that was important to the above noted biological processes, but rather the recurrent exposure of the complex and diverse hiofilm to atmospheric oxygen on a frequent basis, followed by the subsequent inundation of the biofilm by anoxic water.

SUMMARY OF THE INVENTION

In 1992, TVA completed a research and development facility at Muscle Shoals, Ala., to investigate the use of constructed wetlands for treating domestic, industrial and agricultural pollutants [C. Breed, "Constructed Wetlands R&D Facility at TVA's Environmental Research Center," in G. A. Moshiri (ed.), *Constructed Wetlands for Water Quality Improvement*, CRC Press, Inc. Boca Raton, Fla., 1993, pp. 369–372].

Research studies at the above mentioned facility have been conducted to test the hypothesis that wetland plants can transport significant amounts of dissolved oxygen to the rootzone, thereby providing supplemental oxygen for aerobic microbial processes [Steinberg, et al., "Oxidation of the Root Zone by Aquatic Plants Growing in Gravel-Nutrient Solution Culture," *J. Environ. Qual.*, Vol. 23, pp. 907–913, 1994]. Contrary to the suppositions of numerous prior art investigators, the results of this study revealed that net oxygen transfer from the plants to the bulk water was less than the control (no plants), indicating that plant root respiration and root exudates were in fact a net user of oxygen, and thus could not be expected to provide a significant amount of oxygen for aerobic microbial processes.

Concurrently, studies were also initiated at the TVA facility to determine the efficacy of a reciprocation process, whereby adjacent gravel-backfilled cells were alternately drained and filled with water, on a recurrent basis, to enhance transfer of atmospheric oxygen to the bulk water via diffusion. Reciprocation, as practiced in the instant invention was accomplished by sequentially moving water from one wetland cell to a contiguous cell on a batch loaded (no flow-through), and recurrent basis. Movement of water to initiate reciprocation can be accomplished with gravity, electrical and/or solar pumps, and/or u-tube air-lift principals. With u-tube air-lift applications, enhanced oxygenation is brought about by both mechanical means (u-tube air-lift and associated fine-bubble aeration), and by increased oxygen diffusion due to exposure of wetted surfaces of the rock (substrate), during the draw-down phase. Results of this preliminary study, detailing aspects of reoxygenation of water in deoxygenated and non-biological systems, were published in a regional symposium [L. L. Behrends, et al., "Oxygen Diffusion Rates in Reciprocating Rock Biofilters: Potential Applications for Subsurface Flow Constructed Wetlands," in Proceedings Subsurface Flow Constructed Wetlands Conference, University of Texas at El Paso, Aug. 16–17, 1993, supra].

Subsequent to the above-mentioned study, other studies (unpublished) were undertaken to better understand the relationship between oxygen dynamics and the impact of oxygen concentration on rates of nitrification, denitrification, removal of carbon (biochemical oxygen demand), and biological phosphorus removal. It was only after conducting these additional and unpublished studies that it became apparent that it was not the reaeration of the water per se, as was concluded in the aforementioned published article, that was important to high-rate nitrification rates, but rather the sequential exposure of the biofilm to atmospheric oxygen on a frequent basis. Furthermore, it was during these latter unpublished studies that investigators came to realize that the sequential exposure of fixed-biofilms (growing on the rock's surfaces), to aerobic and anaerobic environments enhanced not only nitrification, but denitrification, biological phosphorus removal, metals removal and removal of recalcitrant compounds such as the explosives TNT and RDX. These subsequent studies and other related studies, which will be described later, are the bases for the teachings, disclosure, and practice of the instant, new, and novel invention.

As will be further appreciated, it simply was not previously determined, prior to the aforementioned studies, that reciprocating subsurface-flow wetlands could promote and accelerate aerobic and anaerobic wastewater treatment processes, oxidize reduced gases (methane, hydrogen sulfide and nitric oxide), provide environments conducive to enhancing die-off rates of pathogenic micro-organisms, and/or interfere with the life cycle of nuisance insects such as mosquitoes. More particularly, practice of the present invention entails an improved design and operating process for paired subsurface-flow constructed wetlands. With the concept of recurrent reciprocation, the wetlands' substrates (backfill) and their associated biofilms are exposed to atmospheric oxygen concentrations at frequent and intermittent intervals via the sequential and recurrent filling and draining of paired contiguous wetland cells. During the drain cycle, atmospheric oxygen is rapidly supplied to the de-watered and relatively thin (from about one micron to about two millimeters thick) microbial biofilms residing on backfill substrate, i.e., river gravel and/or limestone, and/or any other appropriate substrate, thus promoting growth of aerobic bacteria which are responsible for oxidizing ammonia (nitrification), various heavy metals, and other toxic compounds. As a point of elaboration, oxygen diffusion in air is 10,000 times faster than oxygen diffusion in quiescent water. During the fill cycle, interstitial water remains anoxic and/or anaerobic, thereby creating environments conducive to reduction reactions such as sulfate reduction, denitrification, and methanogenesis. The combination of aerobic and anaerobic environments, as enabled by the recurrent reciprocation process, provides coupled oxidation-reduction environments that are required for treating mixed wastes and recalcitrant compounds.

Of particular importance, it should be noted that the fill cycle also provides another critical feature, wherein the nutrients required for microbial growth, carbon reduction, and wastewater treatment activities are provided on a regular basis during same. The substrate and attached biofilms can have negative electrical charges which attract positive-charged ions or compounds introduced during the fill cycle. Accordingly, this cationic exchange principal also plays an important role, because it provides a mechanism for essential plant nutrients and/or contaminants to be sequestered from the liquid medium. Still of further importance, the system can be designed to facilitate control of water depth during the fill cycle such that a thin lens of wastewater, 1 to 10 cm deep, is exposed to sunlight thus allowing photo-oxidative processes, algal photosynthesis, photosynthetic uptake of carbon dioxide, and the subsequent elevation of pH. These visible light-spectrum induced processes are often correlated with reductions in heavy metals, faecal coliform bacteria and viruses in domestic wastewater.

OBJECTS OF THE INVENTION

It is therefore the principal object of the instant invention to develop a new constructed wetlands wastewater treatment system, both the design and operation of which invokes spacial and temporal aerobic and anaerobic environments within the treatment system to facilitate a wide range of biotic and abiotic processes for removing nutrients, organic compounds, metals, noxious gases, explosives, and in certain instances nuisance and pathogenic organisms; although the principal mode of removal is related to a wide range of microbially mediated redox conditions which bracket both aerobic and anaerobic conditions.

Another object of the present invention is to develop an underdrain system to prevent plugging of pore void space (hydraulic channels), while optimizing treatment conditions; such that backfill material (substrate), in a constructed wetland will be composed of at least two size grades of backfill material such that the large size grade is distributed on the lower (bottom) potion of the treatment cells and the smaller size fraction is distributed on the top (upper) portion of the treatment cells. This combination of substrate sizes provides an optimized environment and water management scenario in which substrate surface area for microbial biofilm development is significantly increased (small and uppermost substrate), and water movement is optimized as measured by rapid infiltration and movement of liquid wastewater in both vertical and horizontal aspects within and between treatment cells via use of large substrate backfill material and the accompanying enhanced void space which provides pore-channels for rapid water movement as described above.

Still another object of the present invention is to develop a constructed wetland treatment system in which environmental factors, namely, dissolved oxygen concentrations, are sufficiently high, on an intermittent basis, to support and enhance growth and productivity of both wetland and terrestrial plant species, and that root and shoot production are controlled by environmental factors, i.e. dissolved oxygen, redox conditions and nutrient status, and further that the plants abilities to remediate environmental problems (phytoremediation), are enhanced as compared to treatment efficacy in comparable systems in which design and operation are of a standard (non-reciprocating) protocol.

Furthermore, and related to the preceding paragraph, another object of the present invention is to evaluate the utility of the reciprocating wetlands as an environment for the production of cash crops, such as ornamental shrubs, cut flowers, bedding plants, row crops, etc., with the intention to use the proceeds from such production to offset costs associated with wastewater treatment.

Another object of the present invention is to develop and evaluate the reciprocating wetlands as a treatment environment to address and remediate other nuisance conditions beyond those already mentioned. As mentioned earlier, these include: the control of the mosquito life-cycle, wherein the reciprocating wetlands environment interrupts the normal larval development of the mosquito, thereby leading to an effective control of the population; oxidation of noxious odors such as hydrogen sulfide, poisonous gases and greenhouse gases (di-nitrogen oxides), via oxidative and reductive processes mediated by aerobic and anaerobic action of aerobic and anaerobic bacteria which reside both in the interstitial pore water and as attached biofilms on the small and large substrates.

BRIEF DESCRIPTION OF THE DRAWINGS

The present invention will be better understood from a consideration of the following description taken in connection with the accompanying drawings in which.

Figure 1:
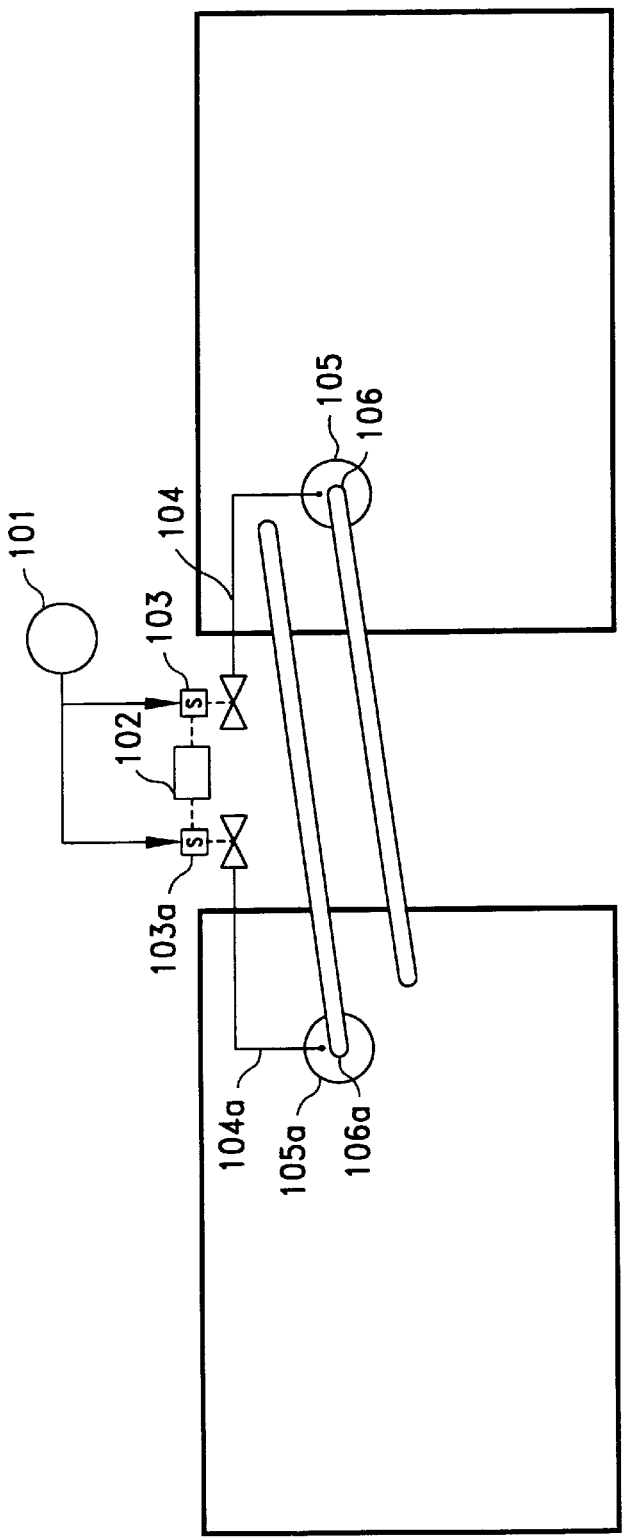
FIGS. 1 and 2 show respectively a planer as well as a detailed cross-sectional view taken along line 2—2 of FIG. 1 of the instant, new, and novel reciprocating subsurface-flow constructed wetland system, including, but not necessarily limited to the following system components: paired contiguous cells, backfill substrate (large on bottom, small on top), deep u-tube airlifts (or centrifugal pumps), two-channel programmable digital timer and electrically activated solenoid valves. As is noted, infra, mechanical water pumps can be used in lieu of the air pump/air-lift combination, but for purposes of this illustration, the air-blower and air lift combination is shown. The cross-sectional view of FIG. 2 also details the relationship of water flow dynamics and water depth with respect to the instant, new, and novel reciprocation fill and drain procedure.

As noted above and as treated in the discussion of the prior art, many existing wastewater treatment facilities of the constructed wetland type were originally installed in pairs for a number of reasons, including consideration of having a "backup" if one cell needs to be taken out of service for repairs or cleaning, it being understood that only a single pair or any number of pairs or sets of multiple wetland cells. This so-called paired horizontal flow design of the prior art now fortuitously allows for simple retrofitting thereof with the instant new novel reciprocation method and means comprising the instant invention. In addition, for ease of understanding on the part of the reader, the drawings, particularly FIGS. 1 and 2, likewise depict only one set of a two-cell or paired contiguous cell arrangement and the descriptions thereof including those found infra in the examples relate to such paired-type configurations. Nevertheless, it should, of course, be appreciated by those skilled in the art that the paired configuration, although a principal embodiment of the investigation and perhaps even more important a most convenient configuration with which to work with is not the only embodiment for the practice of the instant invention, since there undoubtedly will be any number of circumstances wherein the paired cell configuration may not be the most desirable with certain types of topography, land values, and other cost considerations. Accordingly, it should be appreciated that another embodiment of the instant invention relates to a configuration wherein the first cell, or for that matter the second cell may be of a size or capacity substantially greater than any of a number of other contiguous cells. For instance, if the topography is such that a first "mother" cell of considerable capacity be constructed atop a plateau and a number of daughter cells be constructed at elevation(s) therebelow somewhat akin to a rice-patty arrangement, then it might be desirable just, for instance, to have the mother cell at a capacity say ten times or even greater than any of the daughter cells and provide instead of a single, second, paired cell, perhaps ten secondary and smaller daughter cells having capacities substantially equal to or greater or lesser than one another with the aggregate volume thereof substantially equal to the mother cell. It will, of course, be appreciated that under such an arrangement a number of headers as well as lift pumps will be required, probably in an arrangement wherein one set of lift pumps operates between each of the plurality of second cells and the first large cell. In such an arrangement, it will, of course, be further appreciated that, with the proper sizing and capacity of a single primary first cell and a plurality of second cells, the drain times and fill times can be adjusted by properly sizing the pumps and other attendant equipment. In addition, there may be instances wherein the difference in elevation between the first and an arrangement of a plurality of the second cells allows for gravity flow from one to the other whereby only one pump is required for moving fluid back from the bottommost of the plurality of second cells, i.e., the one last in order of hydraulic flow from the first cell. In this variation, it may also be appreciated that similar or different sized cells may be employed at elevations different from one another so that hydraulic flow from one to another may be in series or in parallel hydraulic flow, whereby the last cell or cells downhill from the other cells would be the only one(s) which require a pumping means for returning water back to the first cell which may be at the highest elevation. In any event, what is important to appreciate is that although the instant invention is most conveniently described in terms of paired cells wherein it is inferred that the sizes and capacities of each cell in the pair be equal, that is not necessarily the case, nor is it to be read as a limitation on the disclosure and practice of the instant invention.

Figure 3:
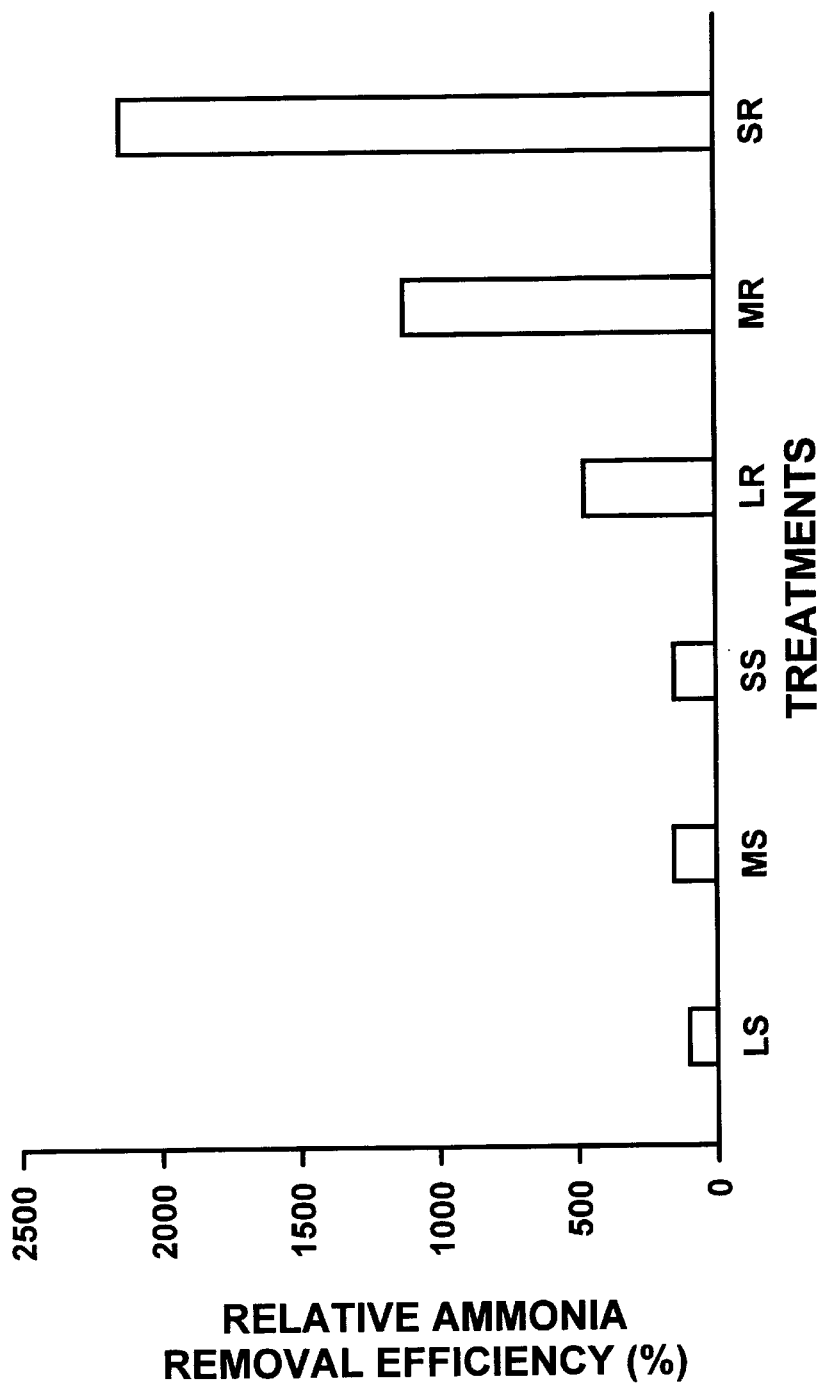
Figure 4:
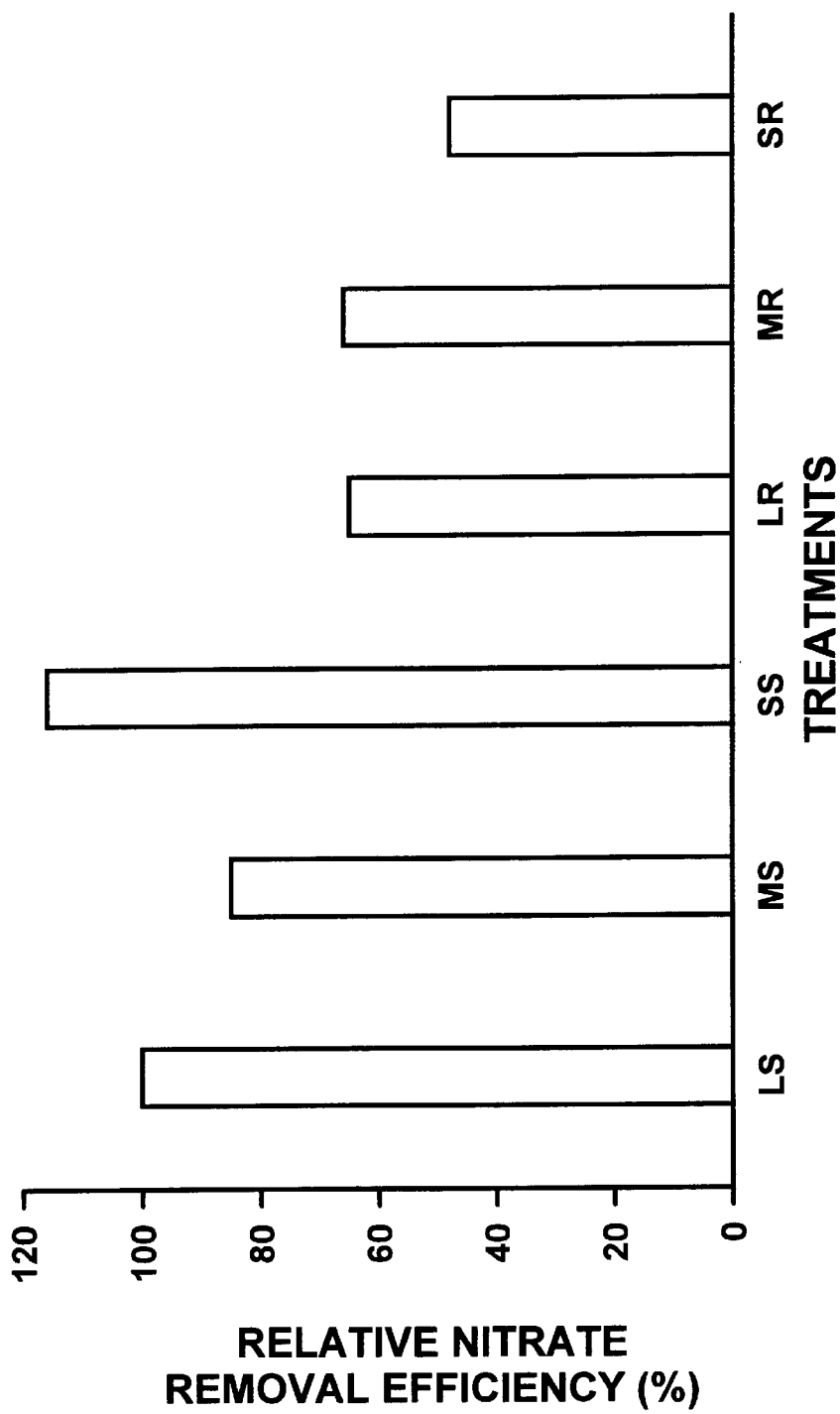
Figure 5:
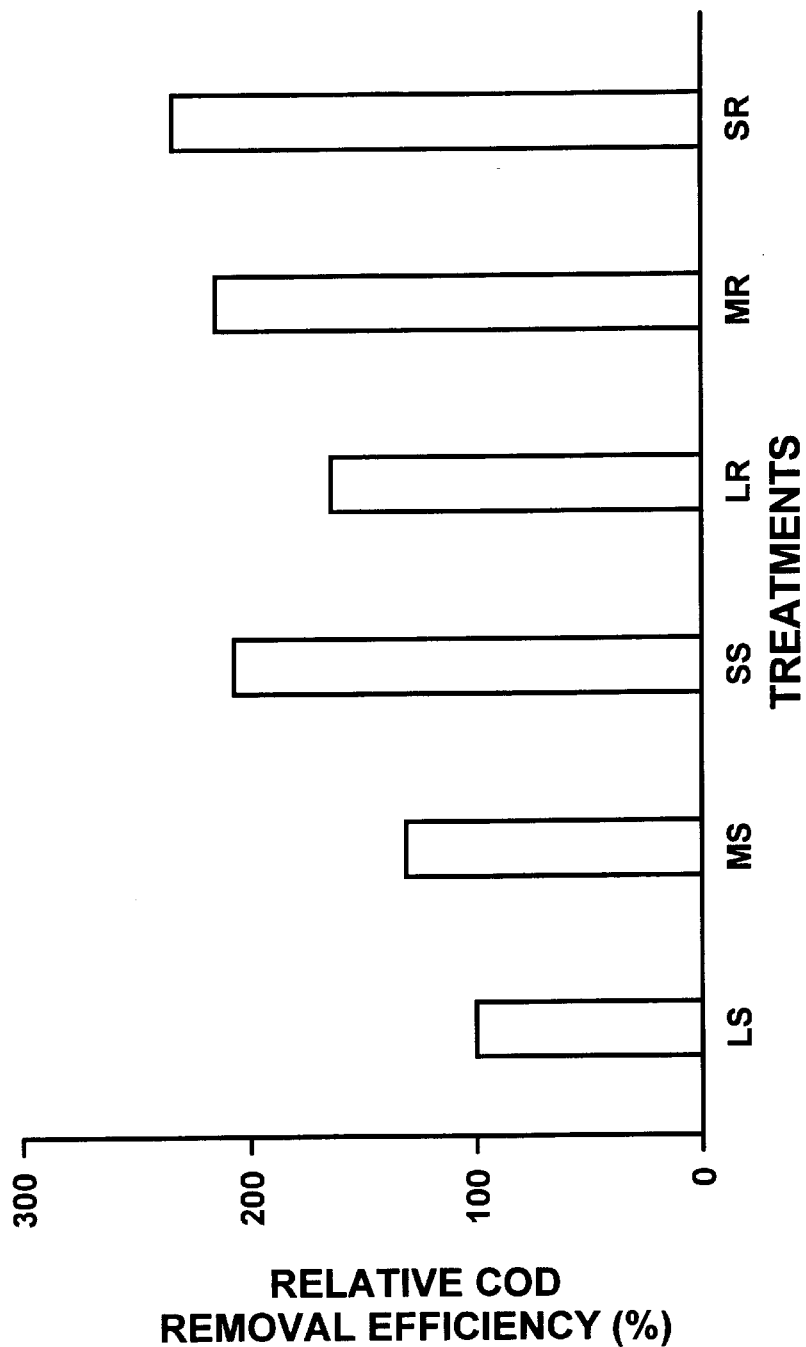

FIGS. 3–5 illustrate the improvements in water quality of three parameters important to the practice of the instant invention, i.e., ammonium nitrogen, nitrate nitrogen, and chemical oxygen demand as a function of substrate (rock) size and water management respectively. For the sake of convenience and greater ease of understanding, FIGS. 3–5 will be discussed in greater detail in conjunction with the discussion of Example II, infra.

DETAILED DESCRIPTION OF THE DRAWINGS

Figure 2:
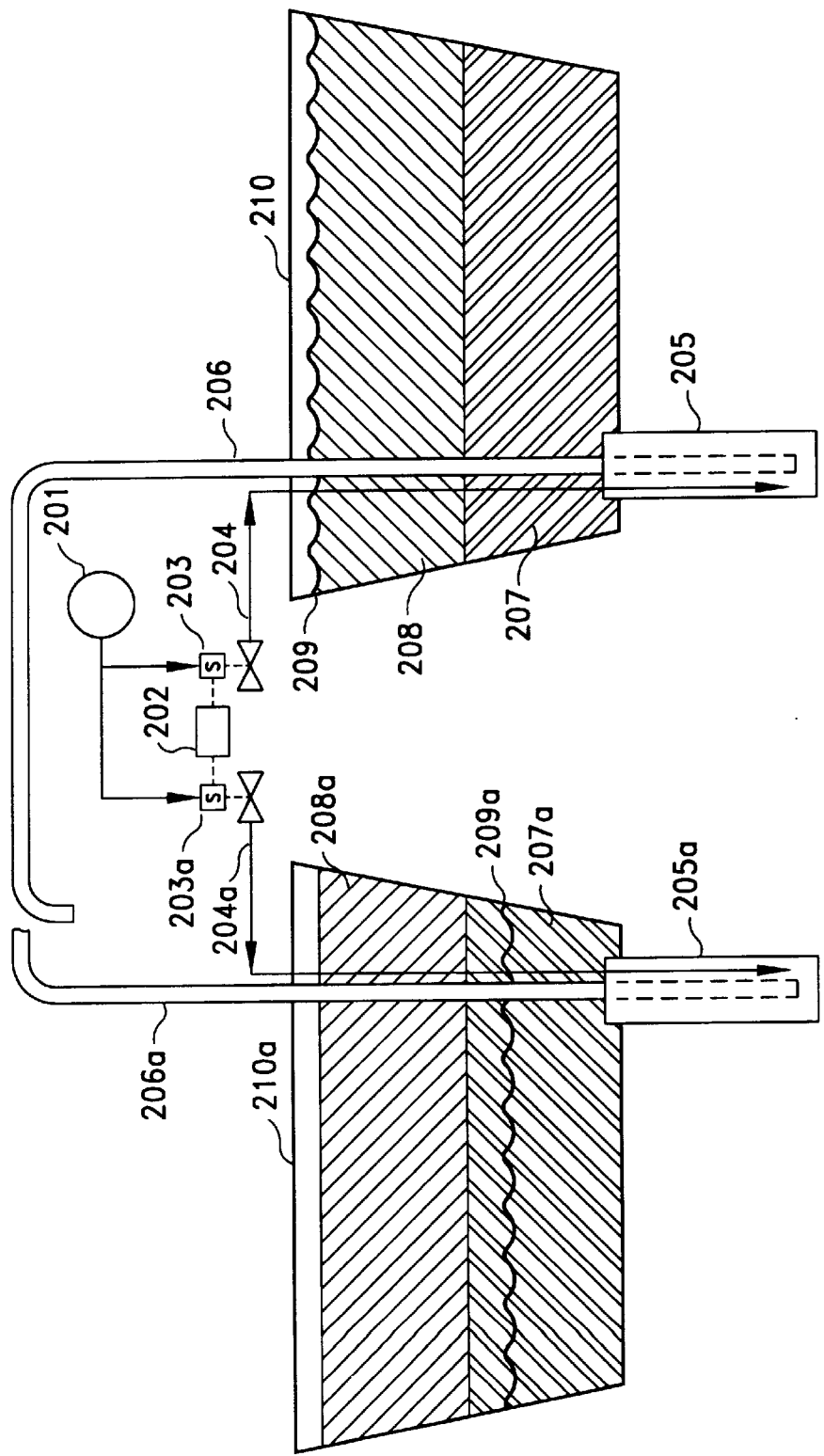

For the sake of clarity and a better understanding of the applicability of the illustrations of the various drawings, a more detailed description of the various drawings is given below. Note particularly, that in both FIGS. 1 and 2, representing a planer and a side-elevational cross-sectional view, respectively, the numbering sequences are indicated such that the digital timer in FIG. 1 is denoted 101, while in FIG. 2, the same digital timer is denoted as 201. It is intended that this correlated convention facilitate a better understanding of the layout of the critical components and how they relate to management, water flow dynamics, and water quality processes. Accordingly, if and when it is desired to simultaneously refer to both 101 and 201 at the same time, the reference thereto would be, for example, 101/201.

Referring now more specifically to both FIGS. 1 and 2, digital timer 101/201 comprises a two-channel programmable model which facilitates programming to electrically energize either of solenoid valves 103/203 or 103a/203a, on a sequential and recurrent basis. Programs (on/off sequences), to energize solenoid valves 103/203 or 103a/203a vary on a case-by-case basis, and are developed empirically for each type of waste stream to be remediated. Air generated from conventional air blower(s) 102/202 is directed through that particular solenoid valve which is activated (open) at that time of system operation, and through either corresponding rigid plastic pipe (PVC), 104/204 or 104a/204a.

Also illustrated in FIGS. 1 and 2 are the relative water levels near the end of the fill cycle for cell 208 at 209, and the corresponding drain cycle in contiguous cell 208 at 209a. The relative distance between the water level in cell 208 in the filled position 209 (filled stage), and the top of the cell berm, 210, is referred to as the free-board, and is designed to serve as a reservoir for additional water from such precipitation events as, for instance, rainfall. The freeboard volume can be appropriately designed according to a pre-determined scenario such as a 25- year flood event to accommodate most natural rainfall events. However, as a further precaution, overflow spillways (not shown), can be designed into the system to direct the overflow of water from a flood event to a specific location, e.g., a retention pond (also not shown). In this later scenario, stored water in the retention pond would subsequently be pumped back through the wetland system for treatment, thereby reducing the volume of water in the retention pond, and improving the amount of its particular freeboard for the next flood event.

It will be appreciated that the size and model (type) of air pump 102/202 is case dependent on air flow requirements and the depth to which air is pumped to facilitate water movement. Air pump 102/202 is operated on a continuous basis, although the air flow is directed in only one direction at a time based on which of the paired solenoid valves has been activated to the open position, i.e., either 103/203 or 103a/203a. The resulting air flow is directed downward to the bottom of that particular cell from which it is desired to remove water (in this case, cell 208), where the air is released into either of u-tube air-lift devices 205/205a. Air can be released either directly into an air-lift tube, or more preferably thereinto via an air stone or similar device (not shown), to break the air stream into a large number of micro-bubbles. The resulting small micro bubbles (not shown), which are under hydraulic head pressure facilitate transfer of atmospheric oxygen to the water. Furthermore, as the air bubbles rise through enclosed water column 206, defined conveniently by or with a piece of PVC pipe, the air bubbles affect displacement of water, thus generating an upward flow of water in 206 proportional to the bubble-water displacement quotient. Displaced water moves through pipe 206 and is directed to contiguous cell 208a wherein the water is released and stored until the process is reversed, i.e., timer 101/201 activates companion solenoid valve 203a to the open position and previously activated solenoid valve 203 returns to the closed position. This process is continued indefinitely on a sequential and recurrent basis to facilitate treatment of contaminated water. It should be noted that this process is ongoing and is independent of the hydraulic residence time of the water being treated. The process can be batch loaded or loaded on a continuous basis. The residence time, or time of treatment, is a function of the rate at which influent water is entering the first cell of a particular paired cell system, the void space of the backfill material, and the total volume of the paired cell system. Furthermore, it should be noted that the desired movement of water can be accomplished independently or in combination with other means such as electrical and/or solar-powered water pumps located (not shown) at strategic depths within the backfill to accomplish the same end result as that of air pump 102/202 and associated air-lifts 105/205 and 105a/205a.

Referring now even more specifically to FIG. 2, it will be noted that there are shown two layers of backfill 211/211a and 212/212a. The backfill material can be of organic or inorganic origin or both, and should be of uniform size and preferably nearly round in shape, since mixed sizes and more angular material tend to pack, thus minimizing void spaces and thereby restricting the movement of water throughout the system. The uppermost layer of backfill, 211/211a, should be size graded to ensure uniformly small pebble-size fraction; this facilitate a large surface area for microbial fixed-film proliferation and gas transfer, while the bottom most layer of backfill, 212/212a, should be of a larger grade to ensure void space of approximately 30–50 percent. Large and uniform void spaces facilitate hydraulic movement of water through the systems underdrain and minimizes short-circuiting of the water flow-path. Particle size distribution, for purposes of illustration, could be 1 to 2 cm for the upper layer and 3–4 cm for the lower layer. However, particle sizes for specific applications may range from the size class of sand in the upper layer to bowling-ball sized rocks in the lower layer; size class, however, will influence hydraulic conductivity and surface area for fixed-film attachment. It should be further noted that there are practical trade-offs with respect to particle sizes selected. For example, smaller sizes tend to have larger surface areas for gas transfer and biofilm attachment, but proportionately less pore volume, thus restricting hydraulic movement and setting a lower limit on retention time.

As noted supra, the more detailed description of FIGS. 3–5 is, for the sake of ease of understanding by the reader, discussed in greater detail in conjunction with the description of Example II, infra.

DETAILED DESCRIPTION OF THE INVENTION

In accordance with the teachings of the present invention, a novel wastewater technology for enhancing wastewater treatment for domestic, industrial and agricultural applications, is described. The system(s) as designed and illustrated, for example, in FIGS. 1 and 2, discussed supra, includes air lifts to power aeration and mass flow of water on a sequential and recurrent basis between contiguous wetland cells which are back-filled with size-graded substrates to significantly increase surface area for microbial biofilm development. However, as noted earlier, similar results can be accomplished by using low-pressure high-volume water pumps in place of the air lift system. These reciprocating wetland systems are designed to enhance oxygenation of the de-watered segments of the rootzone and associated substrate biofilm, enhance contact of anaerobic and aerobic biofilm-boundary layers with nutrient rich liquids, enhance spatial and temporal oxidationreduction couples (e.g., nitrification/denitrification), enhance oxidation of reduced noxious gases such as hydrogen sulfide, di-nitrogen oxide(s), and methane, and to provide for conditions to reduce water turbidity such that photo-oxidative processes can be optimized during the filled stage; under which conditions thus may occur the light-induced destruction of pathogenic organisms including bacteria, protozoa, fungi and viruses. The instant, new and novel invention as designed in one preferred embodiment thereof, can also be used to facilitate and control the relative growth of roots/shoots/and other plant tissues of a wide range of vascular and non-vascular terrestrial and aquatic plants. This specific reference to control of root/shoot growth has important implications for practice of the relatively new science referred to as phytoremediation.

In the presence of exogenous and/or endogenous carbon substrates (labile organic matter), the interstitial water (water between the substrate), remains anoxic and/or anaerobic, thereby promoting reducing conditions required for microbially mediated sulfate reduction, denitrification, and methanogenesis. Many waste water sources, especially domestic sewage and/or animal wastes, have copious amounts of labile organic matter required for developing anaerobic conditions. In treatment scenarios wherein anaerobic conditions are required, but labile organic matter is not a component of the waste stream, it may be necessary to add organic matter to facilitate the development of anaerobic and reducing environments. Sources of organic matter can include animal manures, composted vegetation, or commercial sources such as dried whey, milk replacement starter or various grain meals.

During the so-called drain stage of the system comprising the instant invention, the microbial fixed film on the backfill substrate is exposed to atmospheric oxygen, and it has now unexpectedly been found that the resulting exposed films can be saturated with oxygen within as little as 30 seconds of de-watering (TVA, unpublished data, 1995). In certain instances, it is also possible for the surface of the biofilm to be aerobic, while the deeper underlying biofilm layers are functionally anaerobic. Thus, in the design and operation of reciprocating subsurface-flow wetland systems, it is possible to have both highly oxidized and highly reduced conditions in the same system in such a way as to promote spacial and temporal coupling of oxidative and reductive reactions both of which are often required for effective wastewater treatment. The controlled and sequential exposure of wastewater to highly oxidized and highly reduced environments on a temporal and spacial basis provides opportunities for remediation of a broad range of pollutants including, but not restricted to, nutrients, metals, pesticides, dyes, explosive compounds, and other toxic compounds contained in domestic, industrial, and agricultural wastewaters. As should be readily appreciated by those skilled in the art, the instant new technology is relatively simple, energy-efficient and can be retrofitted to existing subsurface-flow constructed wetlands.

DETAILED DESCRIPTION OF THE PREFERRED EMBODIMENTS

This detailed description is in reference to a wastewater treatment system design and operating procedures therefore which are specific to reciprocating subsurface-flow constructed wetlands, in which a portion of water within the confines of paired subsurface-flow wetlands is moved via pumps, gravity and/or air-lifts from a first wetland cell, to a contiguous cell where it is stored temporarily; subsequently a portion of the water in such second or paired and contiguous cell is returned to the first cell, thereby initiating a recurrent reciprocating process. This process may be continued for as long as required to meet treatment objectives, and is independent of system retention time, as long as retention time is significantly longer than reciprocation cycle time. For example, hydraulic retention time of domestic wastewater in the reciprocating system may range from 0.5 to 15 days while reciprocation cycles may range from 6 times an hour to 2 times a day. Management and operation parameters are dependent on the strength of the wastewater, size of the system, and the degree of treatment desired.

Total depth of the overburden and underdrain can range from less than 12 inches to several feet of depth, possibly as much as 12 feet, with the optimum configuration being dependent on land values and wastewater characteristics. For domestic wastewater applications, an overburden of small gravel of 1 foot depth and an underdrain of larger gravel of 1 foot depth has proven to be adequate for removal of biochemical oxygen demand (BOD), total ammonia nitrogen (TAN), suspended solids, and to a limited extent, total phosphorus. In other applications, the ratio of overburden and underdrain and absolute depth may vary for the reasons stated above.

The instant process should be designed to use a large substrate underdrain (rock or other material), to facilitate rapid vertical and horizontal movement of water. An underdrain may be necessary in treatment scenarios where microbial biofilms become thick enough to clog the pore spaces of smaller gravel fractions, thereby impeding hydraulic flow. However, it should be noted that smaller gravel substrates have larger surface areas for microbial production and subsequent enhanced bioremediation. By utilizing both the small substrate overburden and the large substrate underdrain, it is possible to have both enhanced surface area for improved treatment, and ample hydraulic conductivity respectively.

Treatment efficacy of standard wetland designs are affected by length to width aspect ratios and hydraulic short-circuiting because of their intrinsic plug-flow mode of operation. It is anticipated that for reciprocating systems, which operate as partially mixed reactors due to the mixing induced by recurrent reciprocation, short circuiting and aspect ratios will not significantly impact treatment efficacy, and thus the most cost effective designs and aspect ratios can be used. This factor may also be important from the standpoint of constructing a treatment wetland on an irregularly shaped piece of land, or for reasons of aesthetics, wherein an irregularly shaped wetland system would be more appealing than the common rectangular shapes.

In this vein, it should be, of course, realized that the aesthetics or the irregularly shaped piece of land, supra, might well dictate that the alternative embodiment of the instant invention be effected wherein instead of an arrangement of paired cells with each cell in a given pair having essentially the same capacity one to the other, there may be reason to design into the instant invention the alternative arrangement wherein the first cell of the pair has considerable capacity and the cell which would comprise the second of the pair is in reality a plurality of individual smaller cells wherein the total capacity of this plurality is essentially equal to the capacity of the first cell, supra. As discussed with this alternative embodiment, in the treatment of the detailed description of the drawings, supra, this alternative arrangement would require, in most instances one or more sets or pairs of pumps or other liquid-moving means between each of a plurality of smaller cells and the large singular cell, unless, of course, a difference in elevation between the situs thereof is utilized or wherein the cells are essentially of equal capacity but wherein each one or each set is at a different elevation from the previous one or set thereof allowing for gravitational flow through perhaps a whole series of cells wherein pumping means is not required but merely some type of valving or gate or weir means and wherein is built further thereinto a sequence of opening and closing of such gates whereby any given particular cell can be filled or drained by the cell either at the higher elevation or at the lower elevation, respectively. With these variations in mind, the reader will now be returned to a disclosure and description wherein the substantially equal capacity paired and contiguous cell arrangement is utilized for ease in describing parameters and practice of the instant, new and novel invention, it being understood, of course, that this instant invention is not necessarily limited to such a paired and contiguous substantially equal capacity two-cell arrangement.

Substantial freeboard is designed into the system to act as temporary storage of wastewater and natural precipitation. In the practice of this invention, wastewater from the de-watered cell is stored in a contiguous cell and vise-versa during the duration of the reciprocation process. This concept of freeboard also allows a relatively thin lens of the wastewater to be exposed to sunlight or artificial lights (UV light disinfecting applications) during the flooded or filled stage for the purpose of enhancing photo-oxidative processes, which can be significant with respect to die-off of microbial pathogens, removal of dyes, metals, explosives, and other light/pH sensitive reactions. Reciprocation also interferes with the life cycle of mosquitoes and other nuisance insects, and thereby reduces the potential for transmission of vector-borne diseases. Furthermore, reciprocating systems can remove (oxidize) noxious gases such as methane, di-nitrogen oxide, and hydrogen sulfide, thereby diminishing the negative affects of green house gases and offensive odors respectively.

System management criteria, including hydraulic retention time, substrate loading rate (kg/ha/day), reciprocation depth, and reciprocation cycle time can vary considerably, and are determined empirically, and are based, or dependent on, the type and strength of wastewater, season of the year, and degree of wastewater treatment desired. In certain instances, process controllers can be installed which are designed to optimize treatment variables such as retention time and reciprocation time by including real-time monitoring (via electronic probes), of reaction rate-controlling parameters such as temperature, pH, conductivity, D.O. and/or ORP (oxidation/reduction potential).

A principal factor underlying the gist of the instant invention is the discovery that the instant new and novel recurrent reciprocation process, which is designed to allow atmospheric oxygen to contact and enrich, on an intermittent and recurrent basis, the thin surface water film (microns thick), which encapsulates biofilm and backfill material, affects the diffusion of oxygen through that thin film some 10,000 times faster than diffusion through a shallow water column, such as those associated with aerobic lagoons and conventional treatment wetlands designed for wastewater treatment. Similarly, the diffusion process also allows supersaturated metabolic gases, such as carbon dioxide ($CO_2$), hydrogen sulfide ($H_2S$), and methane ($CH_4$), to pass from the surface film of water, and into the atmosphere. Furthermore, reduced gases such as methane and hydrogen sulfide can be oxidized to carbon dioxide, sulfate and water during the reciprocation process. This can have a positive impact on the gas flux equation which controls global warming (methane has a greater impact on global warming on a volume basis than carbon dioxide). Therefore, reducing emissions of methane and other potent greenhouse gases via reciprocation is a very desirable result of the instant new process.

Various water distribution systems (referred to as headers), can be used to distribute and receive water in the fill and drain sequences as appropriate. It is possible to have a single point of entry and exit, but on larger constructed wetlands applications (reciprocation flow in excess of 200 gpm), it may be necessary to install appropriate headers to facilitate the even distribution and receiving of water in the reciprocation process. Specialized engineering texts are available and should be referred to with respect to sizing and placement of such header systems.

The wetland cells can be planted with various plants to enhance nutrient uptake and other phytoremediation treatment processes. Because the reciprocation process allows development of an aerated rootzone, it is possible to use either aquatic or terrestrial plant species. However, the presence or absence of vascular and non-vascular plants is only an extension of possible treatment options available to the instant, new reciprocation system, since microbial action alone is often sufficient for removing and/or transforming a broad range of constituent pollutants.

In the preferred embodiment as herein described, wetland cells should be sealed with a synthetic or earthen (clay), liner to prevent seepage, and subsequent contamination of ground water. Each cell should be backfilled with an appropriate inert and/or organic material, such as gravel, coral, shredded tires, etc., to provide substantial surface area for colonization by inoculated and/or ubiquitous microbial populations associated with wastewater treatment. Size and uniformity of the backfill material should be consistent with engineering criteria pertaining to porosity, hydraulic conductivity, and surface area as described earlier. Free-board is that portion of the retaining perimeter berm above the level of back-fill (refer to 210/210a, FIG. 2, supra); it should be of sufficient height to retain and store the wastewater from the contiguous cell, as well as water input from natural precipitation events.

With respect to mechanical pumps and airlift applications, two-channel programmable digital timers and/or solenoid valves (air-lift applications), preferably should be used to define the frequency and duration of the fill and drain cycles. Frequency and duration of the reciprocation cycles, and the depth of reciprocation will, as noted previously, be according to wastewater type, pollutant(s) concentration(s), system retention time, and degree of treatment desired (e.g., percent removal of pollutant load).

EXAMPLES

In order that those skilled in the art may better understand how the present invention works and can be utilized, the following examples are given by way of illustration only, and are not necessarily by way of limitation, since numerous variations thereof will occur and will undoubtedly be made by those skilled in the art without departing from the true scope of the instant invention herein taught and disclosed.

Example I

The results of tests comprising this Example I illustrate the enhancement of oxygen transfer due to the reciprocation process, and were conducted in six rectangular opaque polyethylene microcosms, or cells with each measuring 120×60×30 cm, and comprising some 0.72 m² located in a large environmentally controlled greenhouse. The four sides and bottom surfaces of the microcosms, or cells were covered with aluminum foil to exclude light and reduce growth of attached algae. Each cell was equipped with a single 10 cm and 15 cm diameter upright section (30 cm in length) of slotted polyvinyl chloride pipe (PVC), to serve as sampling port and pump sump, respectively. Five of the six cells were back-filled to a depth of 20 cm with washed river gravel ranging in size from 1–5 cm (long axis). The sixth cell was filled with an equivalent volume of deoxygenated tap water to serve as a control, simulating an open water lagoon-type environment (see later mentioned treatment descriptions).

The void space of the gravel averaged 35.9 percent (standard deviation=1.6 percent, n=3). A small sump pump (1/200 hp, Little Giant, model 1AA, Oklahoma City, Okla.), was placed into the sampling well of each of the reciprocating microcosm cells. NOTE: Any references made herein to materials and/or apparatus which are identified by means of trademarks, trade names, etc., are included solely for the convenience of the reader and are not intended as, or to be construed, an endorsement of said materials and/or apparatus.

Pumping rate among reciprocating cells was adjusted to 1875 ml/min. Reciprocation pumping cycles (10 and 20 minutes duration, were controlled with an electronic programmable digital timer. A multiparameter water quality instrument, referred to as a sonde, with battery operated data logger (YSI 6000 Environmental Monitoring System, Yellow Springs Instruments, Yellow Springs, Ohio), was placed into the sampling well of each microcosm cell. The sondes were programmed to monitor D.O. and temperature at 5-minute intervals for the duration of the four day study. Sonde dissolved oxygen and temperature sensors were located approximately 2 cm from the bottom of the treatment cells.

Experimental microcosm treatments included: (1) an open water system (no rock back-fill), containing 120 liters of deoxygenated water; (2) a static rock filter system (rock back-fill to 20 cm depth), containing 62 liters of deoxygenated water; (3) a paired reciprocating rock filter system (each cell containing rock back-fill to 20 cm depth and approximately 62 liters of deoxygenated water); alternately filled and drained on 10-minute cycles, (4) a paired reciprocating rock filter system, same configuration as treatment (3) above, but reciprocated on 20-minute cycles.

Oxygen transfer coefficients were computed according to the following formulas as outlined by the following reference [C. E. Boyd, "Water Quality Management for Pond Fish Culture," Elsevier Scientific Publishing Company, New York, p. 318, 1982].

$$K_d = \frac{\text{Ln}D_1 - \text{Ln}D_2}{t_1 - t_2}$$

Where: $K_d$=the transfer coefficient (expressed as $h^{-1}$); Ln $D_1$ and Ln $D_2$=the natural logarithms of the oxygen deficit, at times $t_1$ and $t_2$, respectively, and where the oxygen deficit equals the difference in the equilibrium concentration (saturation) of oxygen in water and the measured concentration at times $t_1$ and $t_2$, respectively.

Oxygen transfer (OT), expressed as g $O_2/m^2$/day, was estimated accordingly:

$$OT = (K_d \times C_{24} \times 24 \text{ hr/day} \times v \times 10^{-3} \text{mg/g})/(\text{area})$$

Where: C=dissolved oxygen concentration (mg/l) at saturation at 24° C., (average temperature during period of measurement of $K_d$), v=tank volume, and area=surface area of tank (expressed as $m^2$).

Calculated diffusion coefficients, $K_d$ ($h^{-1}$) are shown in Table 1, infra, and were based on reaeration data occurring within the first 8–16 hours of the trial. $K_d$ values for the open water and static rock biofilter were both 0.03, while values for the 10- and 20-minute reciprocation microcosms were 0.12 and 0.05, respectively. In large quiescent open-water systems, such as ponds and lakes, $K_d$ values have been found to range from 0.01 to 0.05, with the higher values associated with wind-induced turbulence. Measurements of $K_d$ in small laboratory tanks range from 0.03 to 0.05 in still water, and up to 0.74 in turbulent water.

The oxygen transfer rates (g $O_2/m^2$/day), shown in Table 1, infra, ranged from 0.53 to 2.12. Oxygen transfer is a function of the diffusion coefficient, water volume and the surface area of the air-water interface. While the $K_d$ values for the open-water and the static rock microcosm were the same, the oxygen transfer rate for the open-water system was twice as great as the static rock system because of the greater (2×) volume of water. The enhanced oxygen transfer rates for the reciprocating microcosms, resulted from increased surface areas related to the thin wetted surfaces of the rocks during the drain cycle. These results indicate that oxygen transfer rates can be increased by increasing wetted surface area and/or increasing the cycling rate of reciprocation.

Summary of the Test Results. The conclusions which may be drawn from the results of these tests are as follows: Reaeration of the open-water microcosm was gradual, taking approximately 34 hours to reach 6 mg/l D.O. In contrast, the 10-minute reciprocation treatment provided relatively quick reaeration, taking only 8 hours to reach 6.0 mg/l. Dissolved oxygen in the 20-minute reciprocation treatment reached 5.8 mg/l, but only after 23 hours. The concentration of dissolved oxygen in the static rock treatment peaked at 4 mg/l, and then declined dramatically. However, as alluded to earlier, the direct oxygenation of the exposed substrate during the drain cycle, enabled prolonged opportunities for oxidative processes to occur since oxygen concentrations at the substrate-air interface were always near 100 percent saturation with respect to oxygen. To reiterate an important point, and one that is responsible for rapid reaeration of the thin water lens (and exposed substrate surface), oxygen diffusion through air is 10,000 times faster than oxygen diffusion through water.

TABLE 1

Diffusion Coefficients ($h^{-1}$) and Oxygen Transfer
Rates (g O2/$m^2$/day; kg/ha/day) for Four Microcosm-Based
Treatments

| Treatments | Diffusion Coefficients K Values ($h^{-1}$) | Oxygen Transfer Rates (g $O_2$/$m^2$/day) | Oxygen Transfer Rates (kg/ha/day) |
|---|---|---|---|
| Open Water | 0.03 | 1.03 | 10.3 |
| Static Rock Filter | 0.03 | 0.53 | 5.3 |
| Reciprocation (10 minutes) | 0.12 | 2.12 | 21.2 |
| Reciprocation (20 minutes) | 0.05 | 0.88 | 8.8 |

Example II

The tests comprising this example illustrate the impact of the reciprocation process on the removal of chemical oxygen demand (COD), ammonium ($NH_4$), and nitrate nitrogen ($NO_3$), and were conducted over an eight-day period to quantify the influence of substrate particle size (small, medium, and large gravel) and water management (20-minute reciprocation cycle vs static rock filter with no reciprocation cycles) on removal of ammonia and chemical oxygen demand (COD), from simulated high strength waste water. Substrates consisted of washed river gravel with mean diameters of 0.5, 1.5, and 3.0 cm; and mean void spaces of 36 percent, 41 percent and 46 percent, respectively, for small, medium and large substrates. Microcosm experimental units of the type used and as described in Example I, supra, were fertilized with acetate and a nutrient solution to allow development of biofilms during a 30-day acclimation period. Fertilization protocol was similar to contemporaneous studies: [Sikora, et al., "Ammonium and Phosphorus Removal in Constructed Wetlands with Recirculating Subsurface Flow: Removal Rates and Mechanisms," in 4th *International Conference on Wetland Systems for Water Pollution Control* 6–10, Nov., 1994. Guangzhou, People's Republic of China pp. 147–161, 1994]

Simulated high strength waste water was prepared by mixing a commercially available powdered milk replacement starter (PMRS) with water at a rate of 2000 mg of PMRS per liter of water. PMRS is a dried commercial powder formulation having the following proximate composition: crude protein, not less than 22 percent; crude fat not less than 20 percent; crude fiber, not less than 0.5 percent; calcium 0.75–1.25 percent; phosphorus not less than 0.7 percent and the following micronutrients: choline chloride, sodium silicoaluminate, manganese sulfate, zinc sulfate, ferrous sulfate, copper sulfate, and cobalt sulfate.

After the 30-day acclimation period, microcosms were drained and approximately 70 liters of the PMRS solution was added to each of twelve microcosm units. This simulated wastewater provided initial COD and total nitrogen concentrations of approximately 2500 and 27 mg/l respectively. Dissolved oxygen, pH, redox potential and temperature were monitored at 3-hour intervals for the duration of the study with YSI 6000 data recording sondes. Discrete whole column water samples were taken from each microcosm on day 1, 2, 4 and 8 and analyzed for total ammonia nitrogen (TAN), and nitrate nitrogen ($NO_3$), using a Latchet Auto Analyzer; COD values were measured using Hach COD kits and a spectrophotometer (Hach Chemical Company, Ames, Iowa). Results of the tests comprising this example quantified the relative importance of substrate size (small, medium, and large gravel), and water management (static vs reciprocating water levels) on dynamics and removal of TAN, $NO_3$ and COD.

Data in Table 2 below summarizes means and standard deviations (S.D.), for four environmental parameters which were monitored for the duration of the study. During this eight-day period, diurnal water temperatures ranged from 18.7 to 28.1 degrees C. Following addition of the PMRS, D.O. concentrations decreased rapidly in all treatments from 8 mg/l to less than 1.0 mg/l within six hours and stayed at chronically low concentrations (<1.0 mg/l), for the duration of the study. Redox potentials (mV), averaged over substrate sizes, averaged 209 and −140 for static and reciprocating treatments, respectively. The significantly lower redox potentials in the reciprocating systems were not anticipated, but probably resulted from higher metabolic rates associated with combined aerobic and anaerobic degradation of the PMRS. Average pH values for static and reciprocating treatments averaged 7.7 and 7.8, respectively; average values for small medium and large rock substrate treatments were 7.7, 7.8, and 7.8, respectively.

TABLE 2

Mean Environmental Parameter Values (+/− one standard deviation) for Microcosm Study II to Evaluate the Influence of Substrate Size and Water Management on Removal Rates of TAN, $NO_3$ and COD

| Treatment (substrate/ management) | Temperature (degrees C) | D.O. (mg/1) | pH (unitless) | Redox potential (mV) |
|---|---|---|---|---|
| Small/Static | 24.1 (2.43) | 0.5 (0.16) | 7.5 (0.41) | 191 (36) |
| Small/Reciprocating | 23.3 (2.08) | 0.1 (0.07) | 7.8 (0.33) | −68 (101) |
| Medium/Static | 24.5 ( 2.39) | 0.3 (0.18) | 7.6 (0.62) | ** |
| Medium Reciprocating | 22.9 (2.25) | 0.1 (0.02) | 8 .0 (0.62) | ** |
| Large/Static | 25.4 (2.09) | 0.1 (0.01) | 7.9 (0.71) | 227 (56) |
| Large/Reciprocating | 23.3 (2.30) | ** | 7.6 (0.68) | −213 (125) |

**Probe Failure

The water quality data for days 1, 2, 4, 6, and 8 are reported in Table 3 below, which summarizes TAN, $NO_3$ and COD data for each treatment combination. It should be noted, that in general, treatments with reciprocation removed TAN and COD significantly faster than their respective static treatments, and that due to their more oxidizing environments, the reciprocating systems also had higher nitrate concentrations towards the end of the eight day study than their respective static treatments. Substrate size also influenced water quality, with smaller substrates (and more surface area) having a positive impact on oxidation of ammonia to nitrate and removal of COD. However the impact of rock size was not as dramatic as the impact of water management (reciprocation vs. static).

Table 3 below provides raw data referencing instantaneous concentrations of TAN, nitrate nitrogen ($NO_3$), and COD over six sampling episodes representing days 1, 2, 4 6, and 8. Data in the table provides a summary of dynamic changes in the aforementioned parameters over the eight day trial. It should be noted that with respect to ammonia concentration over time, there are two independent factors influencing ammonia dynamics: 1) the instantaneous formation of ammonia due to the microbial breakdown of protein in the milk replacement starter, and 2) the microbial transformation of ammonia to nitrate (nitrification) and/or the uptake of ammonia for protein formation. The difference in the instantaneous rate of formation and uptake of ammonia is equal to the instantaneous concentration of ammonia. By plotting several instantaneous concentrations over time, it is possible to determine if ammonia concentrations are increasing or decreasing, which provides information on relative ammonia removal rates. Simultaneous formation and removal dynamics also affect nitrate concentrations; nitrate is formed due to nitrification of ammonia and removed via microbial denitrification. COD, however, is degraded much more rapidly than it is formed, and thus its removal dynamics are easier to interpret.

For purposes of illustration and to better understand the relative impacts of the various treatments on water quality, mean concentration values were calculated over all sample dates for TAN, ($NO_3$), and COD, and expressed as a percentage of an arbitrary standard treatment mean, respectively. For purposes of this exercise, the referenced standard treatment mean (within a water quality parameter), was based on the large substrate/static water management combination (LS). Other treatment combinations and their respective designations include medium substrate/static water management (MS), small substrate/static water management (SS), large substrate/recurrent reciprocation (LR), medium substrate/recurrent reciprocation (MR) and small substrate/recurrent reciprocation (SR). For instance, these designations, i.e., LS, MS, etc., are used in Tables 4–6, infra.

TABLE 3

Values of Total Ammonia Nitrogen (TAN), Nitrate Nitrogen ($NO_3$) and Chemical Oxygen Demand (COD), Data for Each Substrate and Water Management Combination

| TREATMENT (Substrate/Management) | DAY | TAN (mg/l) | $NO_3$ (ug/l) | COD (mg/l) |
|---|---|---|---|---|
| Small/Static | 1 | 1.2 | 26.8 | 1109 |
| | 2 | 2.9 | 43.2 | 705 |
| | 4 | 3.8 | 44.8 | 577 |
| | 6 | 3.1 | 30.7 | 201 |
| | 8 | 4.6 | 31.1 | 156 |
| Small/Reciprocating | 1 | 0 | 53.8 | 1053 |
| | 2 | 0.6 | 46.3 | 489 |
| | 4 | 0.2 | 40 | 117 |
| | 6 | 0.2 | 68.4 | 78 |
| | 8 | 0.1 | 218.8 | 72 |
| Medium/Static | 1 | 1.7 | 33.5 | 1247 |
| | 2 | 1.2 | 41.6 | 748 |
| | 4 | 3.7 | 39.6 | 672 |
| | 6 | 6.0 | 80.7 | 319 |
| | 8 | 2.8 | 47.7 | 246 |
| Medium/Reciprocating | 1 | 0.2 | 52.5 | 1159 |
| | 2 | 1.3 | 55.3 | 456 |
| | 4 | 0.2 | 44.7 | 210 |
| | 6 | 0.3 | 102.7 | 87 |
| | 8 | 0.1 | 57.5 | 64 |
| Large/Static | 1 | 0.6 | 35.7 | 1339 |
| | 2 | 2.4 | 36.4 | 1034 |
| | 4 | 6.45 | 33.1 | 758 |
| | 6 | 7.1 | 50.1 | 693 |
| | 8 | 7.0 | 50.9 | 419 |
| Large/Reciprocating | 1 | 0.2 | 0 | 1380 |
| | 2 | 0.5 | 64 | 568.8 |
| | 4 | 1.4 | 63.4 | 405 |
| | 6 | 1.4 | 115.8 | 149 |
| | 8 | 1.5 | 73.2 | 88 |

Reference to FIGS. 3–5.

Referring now more specifically to FIG. 3, the relative ammonia removal efficiency, as discussed above, for each treatment combination was compared to the treatment efficiency of the large substrate static water management treatment combination (LS), which was provided a normalized value of 100 percent. With reference to the x-axis which lists the various substrate size water management treatment combinations, LS, MS, SS, LR, MR, and SR, respectively, and the y-axis which provides a quantitative scale of relative removal efficiency, FIG. 3 teaches that under static water conditions ammonia removal efficiency was not significantly affected by changing substrate size from large to medium to small substrate: LS to MS to SS as depicted by small differences in the heights of the respective bar graphs. However, FIG. 3 also teaches that under conditions of recurrent reciprocation there are highly significant differences in treatment efficiencies as depicted by the relatively large differences in the heights of the respective bar graphs LR, MR, and SR. The treatment combination LR was 21 times more effective at removing ammonia as compared to the reference standard treatment combination LS, and reflects the significant improvements in oxygen transfer due to the combination of small substrate size (larger surface are for bacteria and oxygen transfer), and the recurrent reciprocation management which provided frequent oxygenation of the nitrifying bacterial biofilm. As noted earlier, nitrification is very sensitive to oxygen concentrations, and the rate of nitrification is maximized at oxygen concentrations approaching saturation. Again, the biofilm is exposed to atmospheric oxygen during reciprocation, and the thin wetted biofilm approaches saturation with respect to dissolved oxygen. Data upon which this FIG. 3 is plotted is as shown in Table 4, below.

TABLE 4

| Treatment Combinations | TAN % Relative Removal Efficiency |
|---|---|
| LS | 100 |
| MS | 153 |
| SS | 151 |
| LR | 471 |
| MR | 1121 |
| SR | 2140 |

With respect to FIG. 4, the illustration that teaches that differences in the various treatment combinations were relatively small, but that removal efficiency was consistently better in the static water treatments (LS, MS, SS), than the treatments with recurrent reciprocation (LR, MR, SR). This is consistent with the knowledge that denitrification, the microbially mediated process for removing nitrate, is optimized at low oxygen concentrations. The process of recurrent reciprocation, enhances oxygen transfer, which in turn inhibits denitrification. However, it should be noted that the instantaneous concentration of nitrate, Table 3, supra, never exceeded 250 ug/l, irrespective of treatment combination, which is significantly less than the 10,000 ug/l (=10 ppm), which is the threshold concentration at which nitrate becomes hazardous to human health. Data upon which this FIG. 4 is plotted is as shown in Table 5, below.

TABLE 5

| Treatment Combinations | NO$_3$ % Relative Removal Efficiency |
|---|---|
| LS | 100 |
| MS | 85 |
| SS | 116 |
| LR | 65 |
| MR | 66 |
| SR | 48 |

Referring now more specifically to FIG. 5, the illustration teaches two independent facts: 1) with respect to substrate size (and associated specific surface area), there is a consistent improvement in COD removal efficiency, according to the trend S>M>L, and 2) treatment combinations with recurrent reciprocation, had consistently greater relative COD removal efficiency values than their respective static water treatments. Organic matter, such as milk replacement starter, is degraded faster and more completely in aerobic environments than anaerobic environments, which is consistent with the faster removal of COD in the recurrent reciprocating treatments. The combination of small substrate size with recurrent reciprocation (SR) was superior with respect to COD removal efficiency, and was 2.3 times more efficient than the standard treatment (LS). Data upon which this FIG. 5 is plotted is as shown in Table 6, below.

TABLE 6

| Treatment Combinations | COD % Relative Removal Efficiency |
|---|---|
| LS | 100 |
| MS | 131 |
| SS | 207 |
| LR | 164 |
| MR | 215 |
| SR | 234 |

Summary of the Test Results. The conclusions which may be drawn from the results of these tests are as follows. In general, treatments with reciprocation removed TAN and COD significantly faster than their respective static treatments, and reciprocating systems also had higher nitrate concentrations towards the end of the eight-day study. Substrate size influenced water quality, with smaller substrates having a positive impact on oxidation of ammonia to nitrate and removal of COD.

Example III

The tests comprising this example provide evidence of the affect of reciprocation on root-to-shoot ratios and biomass production for various species of plants used in constructed wetlands operations, and were initiated in an outdoor mesocosm study to evaluate the efficacy of reciprocation vs subsurface recirculation on treatment of simulated domestic wastewater treatment in planted wetland cells. Each of four 44 m$^2$ mesocosm units used in this study were double-lined with a 30-mil geosynthetic membrane and had the following design parameters: 7.6×5.8 m; 60 cm deep gravel backfill (0.5–3.1 cm washed river gravel, 35 percent void space), and water volume at capacity equal to 7400 liter. Individual cells were filled to capacity with filtered river water, and water was added to cells throughout the course of the study on an as-needed basis to replace water lost to evaporation and plant transpiration.

Each cell was planted with twelve species of wetland vegetation. Four plants of each species were planted into each cell on approximately one-meter centers for a total of forty-eight plants per cell. The plant species were: Lake sedge, *Ceres crus-corvi*; cattail, *Typha angustifolia*; alpine rush, *Juncus alpinus*; green bullrush, *Scirpus atrovirens*; sweet flag, *Acorus clamus*; bur-head, *Echinodorus cordifolius*; wild reed cane, *Phragmites communis*; local rush, *Carex retrosa*; hardstem bullrush, *Scirpus acutus*; canary grass, *Phalaris arundinacea*; zebra grass, *Miscanthus sinensis* zebrinus, and a terrestrial canna lily. Plants were fertilized with a commercial granulated fertilizer (13 percent N, 13 percent P and 13 percent K), on a biweekly basis for the next six weeks to allow plant establishment and acclimation of native bacterial communities.

After approximately 103 days' of operation, a single whole plant of each species was harvested from each cell and bisected into root and shoot sections, and each section weighed to the nearest gram.

Summary of Test Results. Reciprocation significantly affected plant growth and morphology. Plant populations in each of four cells (two reciprocating and two static-recirculating), were subsampled after 103 days of spring and summer culture, to evaluate the impact of reciprocation and recirculation on plant growth rates and plant morphology. As shown in Table 7, below, seven of twelve species had higher net production in reciprocating systems, with some species having up to 50 percent greater production than their counterparts in the recirculating system. Root to shoot ratios and root morphology were also affected, with ten of twelve species having greater root biomass in the reciprocating system. It was observed that roots of plants in the reciprocating systems grew to a greater depth and had greater root hair development than counterparts grown in the recirculating systems. These factors may have importance with respect to how well these species can sequester and/or phytoremediate various aqueous contaminants.

TABLE 7

Response of Twelve species of Aquatic Macrophytes to Reciprocating and Non-Reciprocating

| SPECIES | ROOT WEIGHT (g dry matter) | | DELTA (%) | SHOOT WEIGHT (g dry matter) | | DELTA (%) |
|---|---|---|---|---|---|---|
| | RECIP | non | | RECIP | NON | |
| CATTAIL | 313 | 229 | +37 | 679 | 427 | +59 |
| CANARY GRASS | 193 | 103 | +87 | 276 | 192 | +44 |
| PHRAGMITES | 118 | 62 | +93 | 233 | 119 | +95 |
| CANNA LILY | 219 | 155 | +42 | 468 | 596 | −27 |
| BURRHEAD | 76 | 151 | −2 | 315 | 896 | −284 |
| HARDSTEM | 115 | 91 | +26 | 110 | 92 | +20 |
| ALPINE RUSH | 91 | 20 | +467 | 31 | 51 | −63 |
| SWEETFLAG | 536 | 450 | +19 | 344 | 370 | −8 |
| ZEBRAGRASS | 59 | 32 | +86 | 156 | 238 | −53 |
| LOCAL RUSH | 89 | 58 | +53 | 113 | 154 | −37 |
| LAKESEDGE | 48 | 76 | −56 | 83 | 225 | −270 |

TABLE 7-continued

Response of Twelve species of Aquatic Macrophytes to Reciprocating and Non-Reciprocating

| SPECIES | ROOT WEIGHT (g dry matter) | | DELTA (%) | SHOOT WEIGHT (g dry matter) | | DELTA (%) |
|---|---|---|---|---|---|---|
| GREEN B.R. | 20 | 13 | +50 | 24 | 21 | +16 |

Example IV

The tests comprising this example illustrate the utility of the instant process for developing closed cycle aquaculture and hydroponic systems in which coupled aerobic and anaerobic processes are utilized to remove biochemical oxygen demand (BOD), total ammonia nitrogen (TAN), nitrate/nitrite nitrogen ($NO_3+NO_2$), and maintain alkalinity and pH within a range conducive to rearing freshwater fish (tilapia) and hydroponic plants (tomatoes).

Summary of Partial Test Results. These testes are continuing at the time of this writing, but early results therefrom indicate that BOD, and nitrate are effectively removed in the anaerobic portion of the reciprocating hydroponic cell, while ammonia nitrogen, nitrite, and residual BOD are effectively removed in the aerobic portion of the reciprocating hydroponic cell. The level of pH has been maintained within the range 6.5 to 8.0, which is suitable for nitrification and fish and plant growth. Feeding the fish a high protein fish led to ammonia production with concentrations reaching 26 mg/l. However within three weeks the nitrifying bacteria were at sufficient levels and activity to oxidize the ammonia such that total ammonia nitrogen levels were reduced to levels less than 1 ppm. By removing the BOD and ammonia in the reciprocating hydroponic unit, much of the oxygen demand is removed making it significantly easier to aerate the fish culture tanks. Currently, we are feeding 90.1 $g/m^2$, of a 36 percent protein feed, which is approximately equivalent to feeding >900 kg/ha of feed. In conventional pond aquaculture, with paddlewheel aeration, it is not safe to feed much in excess of 100 kg/ha/day, as dissolved oxygen is rapidly depleted and ammonia concentrates to levels harmful to fish.

Example V

In late 1995, a small town in southeastern Tennessee requested assistance in upgrading a subsurface-flow wetland system that has been in operation since 1990. This wetland system discharges to a small natural stream, and as such must meet discharge limits as imposed by the NPDES (National Pollution Discharge Elimination System), which is under the control of each State's Water Quality Commission. The specific limitations as imposed by the NPDES permit included monthly average for the following parameters: CBOD5, not to exceed 25 mg/l; suspended solids not to exceed 25 mg/l, fecal coliform not to exceed 1000/100 ml grab sample on a daily basis: dissolved oxygen not to be less than 1 mg/l on a daily basis. According to weekly operating records, the system was often out of compliance with respect to five-day carbonaceous biological oxygen demand (CBOD5), dissolved oxygen concentration, and fecal coliform bacteria count. Ammonia levels, although not currently regulated, were often in excess of 20 mg/l, and the state of Tennessee has recently indicated that they would begin imposing ammonia limits in 1997 of 10 mg/l in the summer months and 4 mg/l during the winter months. Furthermore, residents proximate to the wetland treatment system were complaining about the strong noxious odor related to hydrogen sulfide.

The subsurface-flow system, as designed, consisted of four quarter-acre cells with each cell having dimensions of 50 ft long×220 feet wide×3 feet deep. All four cells were backfilled with graded limestone gravel (2.5–3.0 cm diameter), to a depth of two feet. The void space of the gravel is approximately 45 percent. The system was designed for a total flow of 50,000 gallons per day (gpd), although average flow has been approximately 20,000 gpd. During nominal rainfall events, total flow often approaches 50,000 gpd. The system is configured with two sets of two cells that operate in series; e.g. wastewater flows through cell A and then though cell B before exiting the system and likewise, an equal volume of wastewater flows through cells C and D before exiting.

After evaluating the data and discussing problem solving options, it was decided to install an experimental reciprocating system in each of the two series of treatment wetlands. The goal of this large scale experiment was to determine optimum operating and management protocols to improve odor control and to improve removal of CBOD5, fecal coliform, and ammonia.

The experimental recurrent reciprocation system was designed as a retrofit system. The system has been successfully operated under various experimental guidelines for the past 12 months. Currently, reciprocation is practiced such that water is pumped between contiguous cells at a rate of 600 gpm for periods of up to 2 hours, after which time then pumps are turned off for a period of 4 hours. Reciprocation cycle time is controlled via digital programmable timers. Under current conditions, total pumping time is equal to 8 hours per day at an operational cost of approximately $130/month.

Within a week of turning on the experimental retrofit system, the strong smell of hydrogen sulfide was reduced dramatically. Results of weekly monitoring also revealed continuous improvement of dissolved oxygen concentrations and reductions in CBOD5, ammonia and fecal coliform bacteria. The most recent monthly report for November 1996 indicated that the experimental reciprocating wetland system was in compliance with respect to all NPDES limits. The monthly averages for November 1996 were: ammonia 4.6 mg/l, CBOD 15.9 mg/l, and fecal coliform bacteria 7.2 colonies/100 ml.

INVENTION PARAMETERS

After sifting and winnowing through the data supra, as well as other results and operations of my new, novel, and improved technique, including methods and means for the effecting thereof, the operating variables including the acceptable and preferred conditions for carrying out my invention are summarized below.

| Variables | Operating Limits | Preferred Limits | Most Preferred Limits |
|---|---|---|---|
| Hydraulic Retention Time (days) | 0.10–80 | 1.0–10.0 | 2.0–4.0 |
| Reciprocation Cycle Time (hours) | 0.10–24.0 | 1.0–12.0 | 2.0–4.0 |
| Backfill Substrate Size, Lower Layer (cm) | 2.5–20.0 | 2.5–5.0 | 2.5–4.0 |
| Backfill Substrate Size, Upper Layer (cm) | 1.0–10.0 | 1.0–5.0 | 0.1–2.0 |

-continued

| Variables | Operating Limits | Preferred Limits | Most Preferred Limits |
|---|---|---|---|
| Water Depth (cm), flooded stage | 30–300 | 60–240 | 60–120 |
| Water Depth (cm), drained stage | 10–150 | 15–120 | 15–60 |

These parameters represent the principal parameters that must be kept in mind in predetermining or otherwise arriving at acceptable operation of those aspects of the instant invention pertaining to reciprocating constructed wetlands for wastewater treatment.

A less obvious but equally important parameter is redox potential, which is a measure of the system's state of oxidation or reduction. Redox potential (Eh), designated Eh and measured in mV, is termed aerobic when Eh>300 mV and anaerobic when Eh<−100 mV. At values intermediate (Eh<300 and >−100), conditions are in the anoxic range. Redox potential controls the types of biochemical and chemical reactions which are possible in wetland environments. For example, ammonia can be microbially transformed to nitrate (nitrification), but only in an aerobic environment. Conversely, microbial reduction of nitrate to nitrogen gas (denitrification), can only occur in anaerobic environments. Thus, to optimize both nitrification and denitrification in a treatment wetland requires that aerobic and anaerobic environments be coupled together, either spacially, temporally, or preferably spacially and temporally.

Redox potential can be controlled in organically enriched reciprocating wetlands by controlling the systems retention time, the frequency, duration and depth of reciprocation, and the biomass of fixed-film aerobic and anaerobic microbes. The frequency and depth of reciprocation help to delineate the demarcation of aerobic from anaerobic environments. The constantly flooded substrates remain anaerobic, while the frequently drained overlying substrates are exposed to atmospheric oxygen on a recurrent basis and are thus able to maintain aerobic microbial populations. However, on the flood cycle the aerobic substrates are immersed in anaerobic water. In this way it is possible to have aerobic/anaerobic environments on a spacial and temporal basis, which makes it possible to couple aerobic/anaerobic treatment processes such as nitrification/denitrification.

Biomass of microbes can be controlled to a large extent by controlling backfill substrate surface area, which is a function of substrate size; with smaller substrates having larger surface areas for microbial attachment. Substrates with high cation exchange capacity, such as various zeolites, can also be used to help remove selected cations such as ammonia.

While I have shown and described particular embodiments of my invention, modifications and variations thereof will occur to those skilled in the art. I wish it to be understood therefore that the appended claims are intended to cover such modifications and variations which are within the true scope and spirit of the invention.

What I claim as new and desire to secure by Letters Patent of the United States is:

1. An improved process for removing targeted contaminants from water, which comprises:
   (a) maintaining a first bed of particulate substrate in at least a portion of a constructed first wetland cell;
   (b) maintaining a second bed of particulate substrate in at least a portion of a constructed second wetland cell;
   (c) maintaining microbial biofilm on at least a portion of the surface of said substrate in both said first and said second wetland cell, said microbial biofilm having a first surface juxtaposed said substrate and having a second surface spaced apart therefrom;
   (d) introducing water containing said contaminants into said first wetland cell in quantity sufficient to inundate said substrate means maintained therein for a time sufficient to establish at least in the portion of said microbial biofilm therein furthest removed from said substrate an anaerobic condition;
   (e) removing said contaminant containing water from said first wetland cell in quantity sufficient to expose at least a substantial portion of said microbial biofilm to the atmosphere and transferring said withdrawn contaminant containing water to said second wetland cell in quantity sufficient to inundate the substrate maintained therein;
   (f) subsequently maintaining said microbial biofilm in said first wetland cell for a time sufficient to effect a conversion in at least a portion thereof juxtaposed said second surface from an anoxic or anaerobic condition or both to an aerobic condition and maintaining the inundated microbial biofilm in said second wetland cell for a time sufficient to effect a conversion in at least a portion thereof juxtaposed said second surface to an anaerobic condition;
   (g) thereafter sequentially and intermittently reversing the flow of water between the first and the second wetland cell to effect recurrent reciprocation therebetween whereby inundation of substrate in the first cell occurs while the microbial biofilm in said second cell is exposed to the atmosphere and alternately inundation of the substrate in said second cell occurs while the microbial biofilm in said first cell is exposed to the atmosphere; and
   (h) subsequently removing from either said first or said second wetland cell or both as product, water substantially free of said targeted contaminants.

2. The process of claim 1, wherein the cycle time for said reciprocation ranges between about 0.1 to about 24 hours.

3. The process of claim 2, wherein the quantity of water transferred reciprocally between said first wetland cell and said second wetland cell is sufficient to alternately raise and lower the pool elevation in either cell in the range of between about 20 cm and about 150 cm.

4. The process of claim 3, wherein said substrate comprises two layers wherein the lower layer thereof further comprises particulates ranging from about 2.5 to about 20 cm and wherein the upper layer thereof further comprises particulates ranging in size from about 1 cm to about 10 cm.

5. The process of claim 4, wherein the water removed as product is reciprocated between said first wetland cell and said second wetland cell for a period of time ranging from about 1 to about 80 days.

6. An improved wastewater biological treatment system including anoxic, anaerobic and aerobic environments, wherein both oxidative and reductive processes are effected via sequential and recurrent reciprocation, said system comprising:

first basin means having a bottom portion and side walls for containing predetermined volumes of aqueous media;

first basin microbial biofilm means for effecting anoxic, anaerobic and aerobic environments in at least portions of said first basin means, said first microbial biofilm means having a first surface juxtaposed later mentioned first and second substrate means and having a second surface spaced apart therefrom;

first substrate means in said first basin means for supporting a first portion of said first basin microbial biofilm means, said first substrate means juxtaposed said bottom portion of said first basin means;

second substrate means in said first basin means for supporting a second portion of said first basin microbial biofilm means, said second substrate means being in hydraulic communication with said first substrate means and positioned vertically thereabove;

second basin means having a bottom portion and side walls for containing predetermined volumes of aqueous media;

second basin microbial biofilm means for effecting anoxic, anaerobic and aerobic environments in at least portions of said second basin means, said first microbial biofilm means having a first surface juxtaposed later mentioned third and fourth substrate means and having a second surface spaced apart therefrom;

third substrate means in said second basin means for supporting a first portion of said second basin microbial biofilm means, said third substrate means juxtaposed said bottom portion of said second basin means;

fourth substrate means in said second basin means for supporting a second portion of said second basin microbial biofilm means, said fourth substrate means being in hydraulic communication with said third substrate means and positioned vertically thereabove; and fluid moving means in operative association with said first and said second basin means for effecting sequentially and intermittently reversed transfer of a predetermined volume of aqueous media between said first basin means and said second basin means whereby inundation of substrate in said first basin means occurs while at least a portion of the microbial biofilm in said second basin means is exposed to the atmosphere and, alternately inundation of the substrate in said second basin means occurs while at least a portion of the microbial biofilm in said first basin means is exposed to the atmosphere.

7. The improved system of claim 6 further comprising control means for effecting a reciprocal relationship between the sequential and recurrent filling and emptying modes of said first basin means and said second basin means whereby said first basin means is in the filling mode with aqueous media removed from said second basin means when said second basin means is in the emptying mode and further wherein said first basin means is in the emptying mode with aqueous media removed therefrom when said second basin means is in the filling mode therewith.

8. The improved system of claim 7, wherein said first and said second basin means each comprise subsurface-flow wetland cells having substantially equal volumes.

9. The improved system of claim 8, wherein said substrate means comprise particulate material substantially inert in aqueous media and wherein the particulates comprising same are configured to effect a void space in said first and said third substrate ranging from about 40 percent to about 60 percent and in said second and said fourth substrate in the range from about 15 percent to about 35 percent, thereby optimizing surface areas thereof for fixed-film microbial attachments of said microbial biofilm means and further for optimizing both vertical and horizontal movement therebetween of said aqueous media during said reciprocation of filling and emptying modes.

10. The improved system of claim 9, wherein said aqueous media comprises contaminant containing wastewater.

11. The improved system of claim 10, wherein said first and third substrate material comprises coarse gravel and wherein said second and fourth substrate material comprises fine gravel or coarse sand or both.

12. The improved system of claim 7, wherein said first basin means comprises a single subsurface-flow wetland cell and wherein said second basin means comprises a plurality of subsurface flow wetland cells, the aggregate volume of said cells comprising said second basin means being substantially equal to the volume of said first basin means.

13. The improved system of claim 12, wherein said substrate means comprise particulate material substantially inert in aqueous media and wherein the particulates comprising same are configured to effect a void space in said first and said third substrate ranging from about 40 percent to about 60 percent and in said second and said fourth substrate in the range from about 15 percent to about 35 percent, thereby optimizing surface areas thereof for fixed-film microbial attachments of said microbial biofilm means and further for optimizing both vertical and horizontal movement therebetween of said aqueous media during said reciprocation of filling and emptying modes.

14. The improved system of claim 13, wherein said aqueous media comprises contaminant containing wastewater.

15. The improved system of claim 14, wherein said first and third substrate material comprises coarse gravel and wherein said second and fourth substrate material comprises fine gravel or coarse sand or both.

* * * * *